United States Patent
Nakamura et al.

(10) Patent No.: US 8,928,716 B2
(45) Date of Patent: Jan. 6, 2015

(54) OPTICAL SCANNING DEVICE AND IMAGE FORMING APPARATUS IN WHICH A PLURALITY OF SCANNING OPTICAL SYSTEMS EXCEPT ONE INCLUDE A REFLECTING MIRROR

(71) Applicants: Tadashi Nakamura, Tokyo (JP); Toshiaki Tokita, Kanagawa (JP); Yukio Itami, Kanagawa (JP); Taku Amada, Kanagawa (JP); Shingo Tachikawa, Tokyo (JP)

(72) Inventors: Tadashi Nakamura, Tokyo (JP); Toshiaki Tokita, Kanagawa (JP); Yukio Itami, Kanagawa (JP); Taku Amada, Kanagawa (JP); Shingo Tachikawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/757,998

(22) Filed: Feb. 4, 2013

(65) Prior Publication Data
US 2013/0201536 A1    Aug. 8, 2013

(30) Foreign Application Priority Data

Feb. 6, 2012  (JP) ................................. 2012-022723
Jan. 24, 2013  (JP) ................................. 2013-010703

(51) Int. Cl.
*B41J 15/14* (2006.01)
*B41J 27/00* (2006.01)
*H04N 1/04* (2006.01)
*G02B 26/10* (2006.01)
*B41J 2/47* (2006.01)
*G02B 26/12* (2006.01)
*G02B 27/14* (2006.01)

(52) U.S. Cl.
CPC .................. *H04N 1/04* (2013.01); *G02B 26/10* (2013.01); *B41J 2/473* (2013.01); *G02B 26/123* (2013.01); *G02B 27/141* (2013.01)

USPC .......................................... 347/241; 347/256

(58) Field of Classification Search
CPC ............... G02B 27/145; G02B 27/283; G02B 27/1006; G02B 6/29302; B41J 2202/50; B41J 2/435; B41J 2/473; B41J 2/525
USPC .......... 347/230–233, 238, 241–244, 256–261
See application file for complete search history.

(56) References Cited

U.S. PATENT DOCUMENTS 5,355,284 A * 10/1994 Roberts ........................... 362/30
5,485,194 A *  1/1996 Tateoka ......................... 347/232
(Continued)

FOREIGN PATENT DOCUMENTS

JP         08-005944         1/1996
JP         10-003048         1/1998
(Continued)

*Primary Examiner* — Hai C Pham
(74) *Attorney, Agent, or Firm* — Oblon, Spivak, McClelland, Maier & Neustadt, L.L.P.

(57) ABSTRACT

An optical scanning device includes: a light source device that emits five light beams corresponding to four basic colors and a single specific color; and five scanning optical systems corresponding the five light beams. One light beam in a first waveband among the light beams corresponding to the four basic colors enters one scanning optical system of the five scanning optical systems. The one scanning optical system includes a dichroic mirror that transmits a light beam in a second waveband different from the first waveband. An angle θb formed between a normal to the incidence plane of the dichroic mirror and orthogonal projection to an assumed plane orthogonal to the main scanning corresponding direction of the incident path of the light beam to the incidence plane of the dichroic mirror is set at an angle of 0° or more and an angle of 45° or less.

13 Claims, 10 Drawing Sheets

(56) References Cited

U.S. PATENT DOCUMENTS

| | | | |
|---|---|---|---|
| 7,151,624 B2* | 12/2006 | Kikuchi et al. | 359/204.1 |
| 7,890,034 B2* | 2/2011 | Murayama et al. | 399/299 |
| 2002/0001118 A1 | 1/2002 | Nakajima et al. | |
| 2002/0149666 A1 | 10/2002 | Amada et al. | |
| 2003/0025782 A1 | 2/2003 | Amada et al. | |
| 2003/0156310 A1 | 8/2003 | Suzuki et al. | |
| 2003/0160529 A1 | 8/2003 | Suzuki et al. | |
| 2004/0032631 A1 | 2/2004 | Amada et al. | |
| 2004/0036936 A1 | 2/2004 | Nakajima et al. | |
| 2004/0057096 A1 | 3/2004 | Amada et al. | |
| 2004/0263968 A1 | 12/2004 | Kobayashi et al. | |
| 2005/0024479 A1 | 2/2005 | Itabashi et al. | |
| 2005/0179971 A1 | 8/2005 | Amada et al. | |
| 2006/0132880 A1 | 6/2006 | Amada et al. | |
| 2006/0208179 A1 | 9/2006 | Itami | |
| 2006/0209377 A1 | 9/2006 | Atsuumi et al. | |
| 2006/0238845 A1 | 10/2006 | Atsuumi et al. | |
| 2007/0081152 A1 | 4/2007 | Amada | |
| 2007/0139747 A1 | 6/2007 | Nakahata | |
| 2007/0146852 A1 | 6/2007 | Itami | |
| 2007/0153349 A1 | 7/2007 | Itami et al. | |
| 2007/0216316 A1 | 9/2007 | Hirano et al. | |
| 2007/0297036 A1 | 12/2007 | Nakamura et al. | |
| 2008/0055690 A1 | 3/2008 | Nakamura et al. | |
| 2008/0062386 A1* | 3/2008 | Ito | 353/31 |
| 2008/0062491 A1 | 3/2008 | Nakamura et al. | |
| 2008/0069585 A1 | 3/2008 | Amada | |
| 2008/0174843 A1 | 7/2008 | Masuda et al. | |
| 2008/0192323 A1 | 8/2008 | Nakamura et al. | |
| 2008/0204539 A1 | 8/2008 | Itami et al. | |
| 2008/0204841 A1 | 8/2008 | Suzuki et al. | |
| 2008/0204852 A1 | 8/2008 | Amada et al. | |
| 2008/0218829 A1 | 9/2008 | Nakamura | |
| 2008/0239432 A1 | 10/2008 | Itami | |
| 2008/0239433 A1 | 10/2008 | Amada et al. | |
| 2009/0015897 A1 | 1/2009 | Nakamura et al. | |
| 2009/0052944 A1 | 2/2009 | Kubo et al. | |
| 2009/0059335 A1 | 3/2009 | Amada et al. | |
| 2009/0060583 A1 | 3/2009 | Amada et al. | |
| 2009/0073523 A1 | 3/2009 | Nakamura | |
| 2009/0080907 A1 | 3/2009 | Hagiya et al. | |
| 2009/0201358 A1 | 8/2009 | Nakamura | |
| 2009/0225148 A1 | 9/2009 | Itami et al. | |
| 2009/0231659 A1 | 9/2009 | Masuda et al. | |
| 2009/0323147 A1 | 12/2009 | Amada et al. | |
| 2010/0091083 A1 | 4/2010 | Itami et al. | |
| 2010/0091342 A1 | 4/2010 | Nakamura | |
| 2010/0118366 A1 | 5/2010 | Tokita et al. | |
| 2010/0328417 A1 | 12/2010 | Saisho et al. | |
| 2011/0002025 A1 | 1/2011 | Tokita et al. | |
| 2011/0058230 A1 | 3/2011 | Soeda et al. | |
| 2011/0110687 A1 | 5/2011 | Miyatake et al. | |
| 2011/0216386 A1 | 9/2011 | Watanabe et al. | |
| 2011/0235132 A1 | 9/2011 | Saisho et al. | |
| 2011/0310450 A1 | 12/2011 | Amada et al. | |
| 2011/0316959 A1 | 12/2011 | Saisho et al. | |
| 2012/0044316 A1 | 2/2012 | Amada et al. | |
| 2012/0056968 A1 | 3/2012 | Imai et al. | |
| 2012/0177409 A1 | 7/2012 | Arai et al. | |
| 2012/0182367 A1 | 7/2012 | Masuda et al. | |
| 2012/0236380 A1 | 9/2012 | Miyatake et al. | |
| 2013/0016171 A1 | 1/2013 | Nakamura et al. | |

FOREIGN PATENT DOCUMENTS

| | | |
|---|---|---|
| JP | 2007-171498 | 7/2007 |
| JP | 2010-026440 | 2/2010 |

* cited by examiner

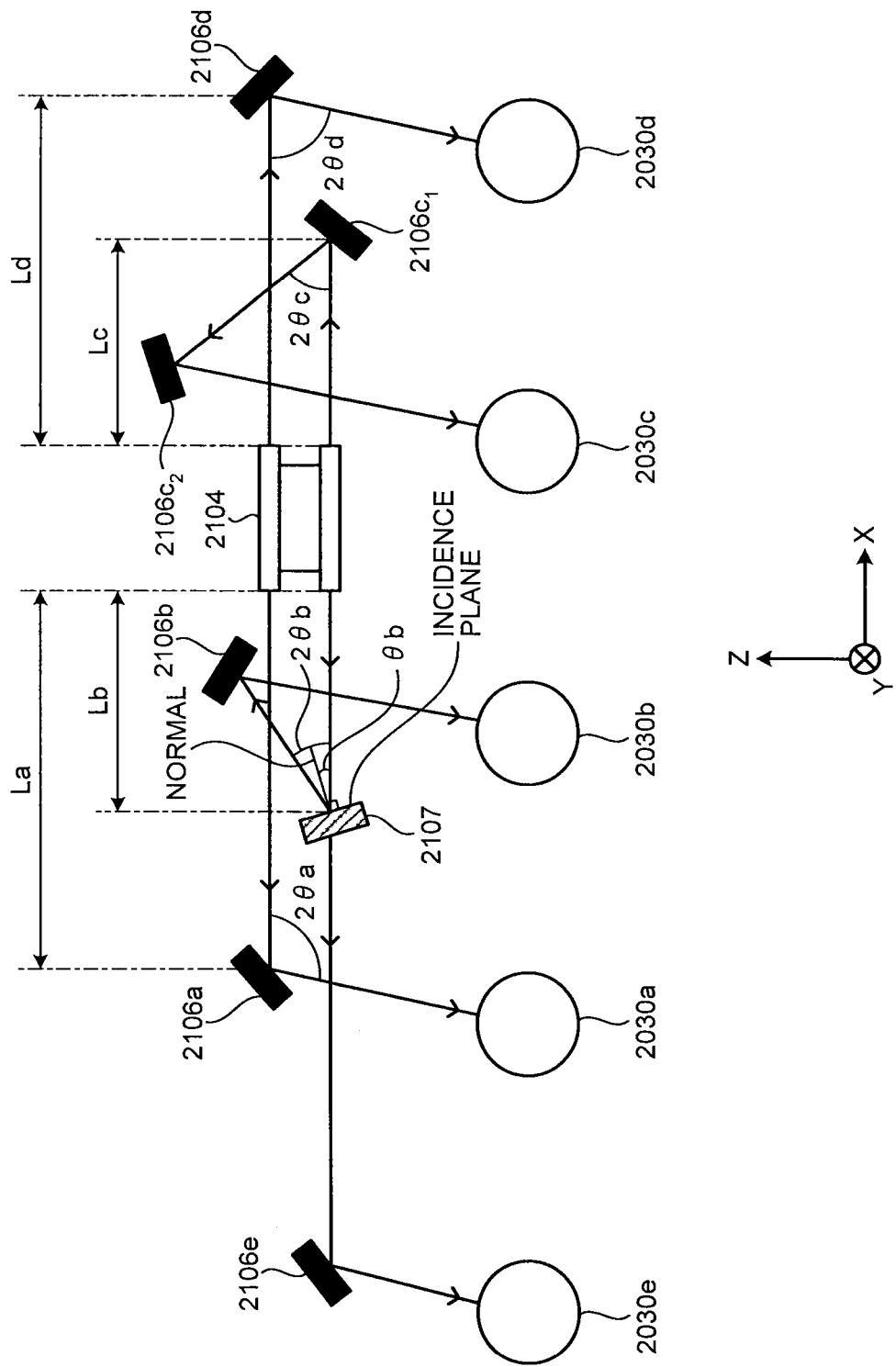

OPTICAL SCANNING DEVICE AND IMAGE FORMING APPARATUS IN WHICH A PLURALITY OF SCANNING OPTICAL SYSTEMS EXCEPT ONE INCLUDE A REFLECTING MIRROR

CROSS-REFERENCE TO RELATED APPLICATIONS

The present application claims priority to and incorporates by reference the entire contents of Japanese Patent Applications No. 2012-022723 filed in Japan on Feb. 6, 2012 and No. 2013-010703 filed in Japan on Jan. 24, 2013.

BACKGROUND OF THE INVENTION

1. Field of the Invention

The present invention relates to an optical scanning device and an image forming apparatus, and more particularly to an optical scanning device that scans a scanned surface with a light beam, and an image forming apparatus including the optical scanning device.

2. Description of the Related Art

Conventionally, such an optical scanning device is known, in which a plurality of light beams emitted from a plurality of light sources is deflected at a deflector and the deflected light beams (five light beams, for example) are guided to a plurality of scanned surfaces (see Japanese Patent Application Laid-open No. 2010-026440, for example).

However, in the optical scanning device, light beams (three light beams, for example) in different wavebands are combined with each other and caused to enter the deflector, and light beams (combined light beams) deflected at the deflector are separated using a large number of optical members (six optical members, for example), so that the configuration becomes complicated, causing an increase in cost.

SUMMARY OF THE INVENTION

It is an object of the present invention to at least partially solve the problems in the conventional technology.

According to the present invention, there is provided an optical scanning device that scans a plurality of scanned surfaces in a main-scanning direction with a plurality of light beams, the optical scanning device comprising: a light source device including at least one light source and configured to emit a plurality of light beams including a plurality of light beams corresponding to at least process colors; a deflector configured to deflect the plurality of light beams emitted from the light source device; and a plurality of scanning optical systems configured to guide the plurality of light beams deflected at the deflector to the plurality of corresponding scanned surfaces.

In the optical scanning device, one light beam in a first waveband of the plurality of light beams corresponding to the process colors enters one scanning optical system of the plurality of scanning optical systems, the one scanning optical system includes an optical member configured to reflect the one light beam and transmit a light beam in a second waveband different from the first waveband, and an angle formed between a normal to an incidence plane of the optical member and orthogonal projection to an assumed plane orthogonal to a direction corresponding to the main-scanning direction of an incident path of the light beam to the incidence plane of the optical member is an angle of 0° or more and an angle of 45° or less.

The invention also provides an image forming apparatus comprising: a plurality of image carriers including a plurality of image carriers corresponding to at least process colors; and an optical scanning device that scans a plurality of image carriers in a main-scanning direction with a plurality of light beams.

In the image forming apparatus, the optical scanning device comprises; a light source device including at least one light source and configured to emit a plurality of light beams including a plurality of light beams corresponding to at least process colors, a deflector configured to deflect the plurality of light beams emitted from the light source device, and a plurality of scanning optical systems configured to guide the plurality of light beams deflected at the deflector to the plurality of corresponding image carriers And in the optical scanning device included in the image forming apparatus, one light beam in a first waveband of the plurality of light beams corresponding to the process colors enters one scanning optical system of the plurality of scanning optical systems, the one scanning optical system includes an optical member configured to reflect the one light beam and transmit a light beam in a second waveband different from the first waveband, an angle formed between a normal to an incidence plane of the optical member and orthogonal projection to an assumed plane orthogonal to a direction corresponding to the main-scanning direction of an incident path of the light beam to the incidence plane of the optical member is an angle of 0° or more and an angle of 45° or less, and the optical scanning device scans one image carrier of the plurality of image carriers corresponding to the process colors with the one light beam.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram for describing scanning optical systems included in the optical scanning device in FIG. 1;

DETAILED DESCRIPTION OF THE PREFERRED EMBODIMENT

Figure 1:
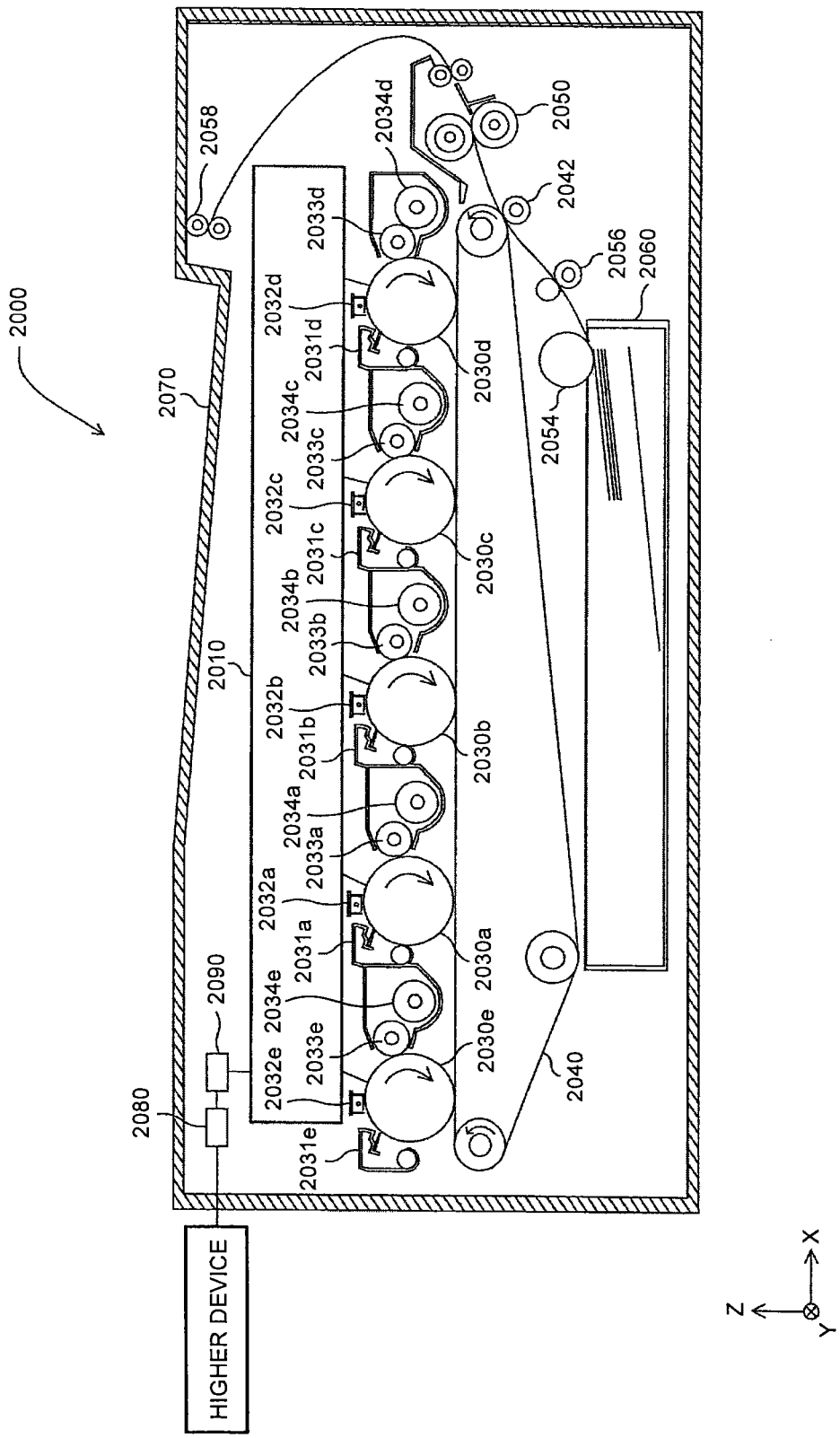
FIG. 1 is a diagram for describing the schematic configuration of a color printer according to an embodiment of the present invention.

In the following, an embodiment of the present invention will be described with reference to FIG. 1 to FIGS. 6A and 6B. FIG. 1 illustrates the schematic configuration of a color printer 2000 according to an embodiment.

The color printer 2000 is a tandem multicolor printer in which four basic colors (black, yellow, magenta, and cyan) for process colors and one specific color (light cyan (light color), for example) are superimposed on each other for forming full color images. The color printer 2000 includes an optical scanning device 2010, five photosensitive drums (2030a, 2030b, 2030c, 2030d, and 2030e), five cleaning units (2031a, 2031b, 2031c, 2031d, and 2031e), five charging devices (2032a, 2032b, 2032c, 2032d, and 2032e), five developing rollers (2033a, 2033b, 2033c, 2033d, and 2033e), five toner cartridges (2034a, 2034b, 2034c, 2034d, and 2034e), a transfer belt 2040, a transfer roller 2042, a fixing device 2050, a paper feed roller 2054, a pre-transfer roller pair 2056, a discharging roller 2058, a paper feed tray 2060, a discharge tray 2070, a communication controller 2080, a printer controller 2090 that controls the components together, and so on.

Here, the description is given in which a direction along the longitudinal direction (the rotating axis direction) of the photosensitive drums is a Y-axis direction and a direction along the arranging direction of the five photosensitive drums is an X-axis direction in an XYZ three-dimensional rectangular coordinate system.

The communication controller 2080 controls bi-directional communications with a higher device (a personal computer, for example) through a network or the like.

The printer controller 2090 includes a CPU, a ROM that stores programs described in code decodable at the CPU and various items of data for use in executing the programs, a RAM that is a working memory, an AD converter circuit that converts analog data into digital data, and so on. The printer controller 2090 sends image information from the higher device to the optical scanning device 2010.

The photosensitive drum 2030a, the charging device 2032a, the developing roller 2033a, the toner cartridge 2034a, and the cleaning unit 2031a are used as a set, and configure an image forming station to form black images (in the following, also referred to as a "K station" for convenience).

The photosensitive drum 2030b, the charging device 2032b, the developing roller 2033b, the toner cartridge 2034b, and the cleaning unit 2031b are used as a set, and configure an image forming station to form cyan images (in the following, also referred to as a "C station" for convenience).

The photosensitive drum 2030c, the charging device 2032c, the developing roller 2033c, the toner cartridge 2034c, and the cleaning unit 2031c are used as a set, and configure an image forming station to form magenta images (in the following, also referred to as an "M station" for convenience).

The photosensitive drum 2030d, the charging device 2032d, the developing roller 2033d, the toner cartridge 2034d, and the cleaning unit 2031d are used as a set, and configure an image forming station to form yellow images (in the following, also referred to as a "Y station" for convenience).

The photosensitive drum 2030e, the charging device 2032e, the developing roller 2033e, the toner cartridge 2034e, and the cleaning unit 2031e are used as a set, and configure an image forming station to form light cyan images (in the following, also referred to as an "LC station" for convenience).

The photosensitive drums include a photosensitive layer formed on the surfaces. Namely, the surfaces of the photosensitive drums are scanned surfaces. It is noted that the photosensitive drums are rotated in the directions of arrows with rotating mechanisms, not illustrated, in the plane in FIG. 1.

The charging devices uniformly charge the surfaces of the corresponding photosensitive drums.

The optical scanning device 2010 apply light beams modulated for individual colors to the surfaces of the corresponding photosensitive drums based on multicolor image information (black image information, cyan image information, magenta image information, yellow image information, and light cyan image information) from the printer controller 2090. Thus, on the surfaces of the photosensitive drums, latent images corresponding to the items of image information are individually formed on the surfaces of the photosensitive drums. The latent images formed here are moved to the directions of the corresponding developing rollers in association with the rotation of the photosensitive drums. The detail of the optical scanning device 2010 will be described later.

Toners from the corresponding toner cartridges are uniformly thinly applied on the surfaces of the developing rollers in association with the rotation of the developing rollers. When the toners on the surfaces of the developing rollers contact the surfaces of the corresponding photosensitive drums, the toners are moved only on portions on the surfaces on which light is applied, and attached to the portions on the surfaces. Namely, the developing rollers attach the toners on the latent images formed on the surfaces of the corresponding photosensitive drums, and make the latent images visible. Images attached with the toners (toner images) are moved in the direction of the transfer belt 2040 in association with the rotation of the photosensitive drums.

Black, cyan, magenta, yellow, and light cyan toner images are in turn transferred on the transfer belt 2040 at predetermined timing, and superimposed on each other for forming a multicolor image.

As described above, colors thicker than cyan and a color lighter than cyan are used to reduce graininess in light color regions, and the reproducibility of images can be improved. The spectral characteristic of pigment included in the light cyan toner is equal to the spectral characteristic of the cyan toner, but the content is smaller than the content of the cyan toner.

The paper feed tray 2060 stores recording sheets. The paper feed roller 2054 is disposed near the paper feed tray 2060. The paper feed roller 2054 picks up recording sheets one by one out of the paper feed tray 2060, and conveys the recording sheets to the pre-transfer roller pair 2056. The pre-transfer roller pair 2056 delivers the recording sheet to a gap between the transfer belt 2040 and the transfer roller 2042 at predetermined timing. Thus, the color image on the transfer belt 2040 is transferred to the recording sheet. The recording sheet on which the color image is transferred here is carried to the fixing device 2050.

Heat and a pressure are applied to the recording sheet at the fixing device 2050, and the toners are fixed to the recording sheet. The recording sheet on which the color image is transferred here is carried to the discharge tray 2070 through the discharging roller 2058, and in turn stacked on the discharge tray 2070.

The cleaning units remove toners (remaining toners) left on the surfaces of the corresponding photosensitive drums. The surfaces of the photosensitive drums from which the remaining toners are removed again return to the locations facing the corresponding charging devices.

Next, the configuration of the optical scanning device 2010 will be described.

Figure 2:
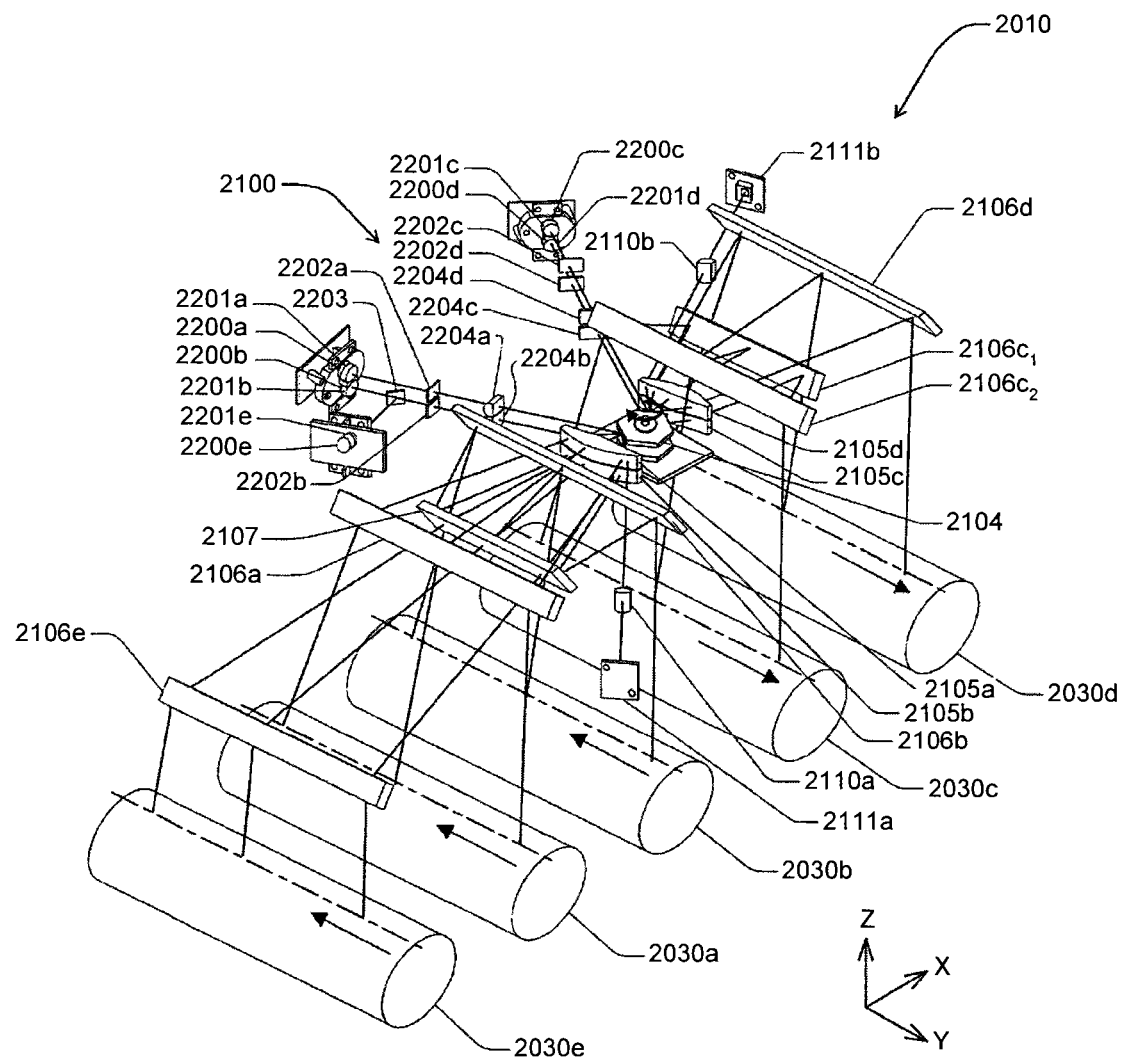
FIG. 2 is a diagram for describing an optical scanning device in FIG. 1.

As illustrated in FIG. 2, the optical scanning device 2010 includes a light source device 2100, a polygon mirror 2104, four scanning lenses (2105a, 2105b, 2105c, and 2105d), six reflection mirrors (2106a, 2106b, $2106c_1$, $2106c_2$, 2106d, and 2106e), a dichroic mirror 2107, two synchronization lenses (2110a and 2110b), two leading end synchronization detection sensors (2111a and 2111b), a scanning control device 3022 (not illustrated in FIG. 2, see FIG. 3), and so on, for example. These components are mounted in an optical housing, not illustrated.

Moreover, in the following, for convenience, a direction corresponding to the main-scanning direction is briefly written in a "main scanning corresponding direction", and a direction corresponding to a sub-scanning direction is briefly written in a "sub-scanning corresponding direction".

The light source device 2100 includes five light sources (2200a, 2200b, 2200c, 2200d, and 2200e), five coupling lenses (2201a, 2201b, 2201c, 2201d, and 2201e), a polarization beam splitter 2203, four aperture plates (2202a, 2202b, 2202c, and 2202d), and four cylindrical lenses (2204a, 2204b, 2204c, and 2204d).

Two light sources (2200a and 2200c) are disposed apart from each other in the X-axis direction, and two light sources (2200b are 2200d) are disposed apart from each other in the X-axis direction. Moreover, two light sources (2200a and 2200b) are disposed apart from each other in the Z-axis direction, and two light sources (2200c and 2200d) are disposed apart from each other in the Z-axis direction. Two light sources (2200b and 2200e) emit light beams in the directions intersecting with each other.

Each one of the light sources includes a single light-emitting element. The light-emitting elements of the four light sources (2200a, 2200b, 2200c, and 2200d) are a semiconductor laser (an end surface emission laser) whose waveband of the oscillation wave length is a 655 nm waveband, for example. The light-emitting element of the light source 2200e is a semiconductor laser whose waveband of the oscillation wave length is a 780 nm waveband, for example.

The light source 2200a is used for forming black images among four basic colors, for example, and corresponds to the K station.

The light source 2200b is used for forming cyan images among four basic colors, for example, and corresponds to the C station.

The light source 2200c is used for forming magenta images among four basic colors, for example, and corresponds to the M station.

The light source 2200d is used for forming yellow images among four basic colors, for example, and corresponds to the Y station.

The light source 2200e is used for forming cyan images among four basic colors, for example, and corresponds to the LC station.

The rotational positions of the light source 2200b and the light source 2200e are shifted at an angle of 90° about the emitting direction, and emit light beams in the polarization directions (the vibration directions) orthogonal to each other.

The coupling lens 2201a is disposed on the optical path of a light beam emitted from the light source 2200a, and forms the light beam into a substantially collimated light beam.

The coupling lens 2201b is disposed on the optical path of a light beam emitted from the light source 2200b, and forms the light beam into a substantially collimated light beam.

The coupling lens 2201c is disposed on the optical path of a light beam emitted from the light source 2200c, and forms the light beam into a substantially collimated light beam.

The coupling lens 2201d is disposed on the optical path of a light beam emitted from the light source 2200d, and forms the light beam into a substantially collimated light beam.

The coupling lens 2201e is disposed on the optical path of a light beam emitted from the light source 2200e, and forms the light beam into a substantially collimated light beam.

The polarization beam splitter 2203 is disposed at a location at which the optical path of the light beam through the coupling lens 2201b intersects with the optical path of the light beam through the coupling lens 2201e. The polarization beam splitter 2203 transmits the light beam through the coupling lens 2201b toward the aperture plate 2202b, and reflects the light beam through the coupling lens 2201e toward the aperture plate 2202b.

Namely, the polarization beam splitter 2203 combines two light beams through two coupling lenses (2201b and 2201e) whose polarization directions are orthogonal to each other, and emits the light beams toward the aperture plate 2202b.

The aperture plate 2202a includes an opening, and shapes the light beam transmitted through the coupling lens 2201a.

The aperture plate 2202b includes an opening, and shapes the two light beams combined at the polarization beam splitter 2203 (in the following, also referred to as a combined light beam).

The aperture plate 2202c includes an opening, and shapes the light beam transmitted through the coupling lens 2201c.

The aperture plate 2202d includes an opening, and shapes the light beam transmitted through the coupling lens 2201d.

The cylindrical lens 2204a is disposed on the optical path of the light beam transmitted through the opening of the aperture plate 2202a.

The cylindrical lens 2204b is disposed on the optical path of the combined light beam transmitted through the opening of the aperture plate 2202b.

The cylindrical lens 2204c is disposed on the optical path of the light beam transmitted through the opening of the aperture plate 2202c.

The cylindrical lens 2204d is disposed on the optical path of the light beam transmitted through the opening of the aperture plate 2202d.

Each one of the cylindrical lenses includes a flat optical surface on one side and a curved optical surface on the other side, and the curved optical surface has a curvature common in the Z-axis direction. The cylindrical lenses are disposed in such a way that the optical path lengths to the location at which the light beam is deflected and reflected at the polygon mirror 2104 are equal to each other.

Each one of the cylindrical lenses has strong power in the Z-axis direction (the sub-scanning corresponding direction), and forms line images longer in the main scanning corresponding direction near the deflection reflecting surface of the polygon mirror 2104.

Four light beams emitted from the four cylindrical lenses and including a single combined light beam, that is, five light beams in total are light beams emitted from the light source device 2100.

The polygon mirror 2104 includes four-sided mirrors in a two-stage structure, and the mirrors are individually deflection reflecting surfaces.

The four-sided mirror in the first stage (the lower stage) is disposed in such a way that the light beam from the cylindrical lens 2204b and the light beam from the cylindrical lens 2204d are deflected, and the four-sided mirror in the second stage (the upper stage) is disposed in such a way that the light beam from the cylindrical lens 2204a and the light beam from the cylindrical lens 2204c are deflected.

The light beams from the cylindrical lens 2204a and the cylindrical lens 2204b are deflected to the negative X side of the polygon mirror 2104, and the light beams from the cylindrical lens 2204c and the cylindrical lens 2204d are deflected to the positive X side of the polygon mirror 2104.

Moreover, a groove is provided between the four-sided mirror in the first stage and the four-sided mirror in the second stage, forming a shape in which windage loss is reduced. The dimension (the thickness) of each of the four-sided mirrors in the Z-axis direction is about 2 mm.

The scanning lens 2105a and the scanning lens 2105b are disposed on the negative X side of the polygon mirror 2104, and the scanning lens 2105c and the scanning lens 2105d are disposed on the positive X side of the polygon mirror 2104.

The scanning lens 2105a and the scanning lens 2105b are stacked in the Z-axis direction, the scanning lens 2105a is opposite to the four-sided mirror in the second stage, and the scanning lens 2105b is opposite to the four-sided mirror in the first stage. It is noted that the scanning lens 2105a and the scanning lens 2105b may be formed integrally.

Furthermore, the scanning lens 2105c and the scanning lens 2105d are stacked in the Z-axis direction, the scanning lens 2105c is opposite to the four-sided mirror in the second stage, and the scanning lens 2105d is opposite to the four-sided mirror in the first stage. It is noted that the scanning lens 2105c and the scanning lens 2105d may be formed integrally.

Substantially the same lenses are adopted to the scanning lenses 2105a to 2105d, for example.

The light beam from the cylindrical lens 2204a deflected at the polygon mirror 2104 is applied to the photosensitive drum 2030a through the scanning lens 2105a and the reflection mirror 2106a, and a beam spot is formed on the photosensitive drum 2030a.

Moreover, the two light beams (the combined light beam) from the cylindrical lens 2204b deflected at the polygon mirror 2104 enter the dichroic mirror 2107 through the scanning lens 2105b.

Here, the waveband of the light beam from the light source 2200e for light cyan, which is a specific color, is the waveband on the long wave length side (the 780 nm waveband, for example). The wavebands of the light beams from the light sources 2200a to 2200d for four basic colors are on the short wave length side (the 655 nm waveband, for example). Namely, the wave length of the light beam for light cyan is longer than the wave lengths of the light beams for four basic colors.

The dichroic mirror 2107 includes a dielectric multi-layer film having a large number of dielectric thin films stacked on each other, for example. The dichroic mirror 2107 reflects the light beam (the light beam for cyan) from the light source 2200b in the two light beams through the scanning lens 2105b, and transmits the light beam (the light beam for light cyan) from the light source 2200e. Namely, the dichroic mirror 2107 separates the combined light beam through the scanning lens 2105b into two light beams at different wave lengths.

The light beam reflected off the dichroic mirror 2107 is applied to the photosensitive drum 2030b through the reflection mirror 2106b, and a beam spot is formed on the photosensitive drum 2030b.

The light beam transmitted through the dichroic mirror 2107 is applied to the photosensitive drum 2030e through the reflection mirror 2106e, and a beam spot is formed on the photosensitive drum 2030e.

Moreover, the light beam from the cylindrical lens 2204c deflected at the polygon mirror 2104 is applied to the photosensitive drum 2030c through the scanning lens 2105c, the reflection mirror $2106c_1$, and the reflection mirror $2106c_2$, and a beam spot is formed on the photosensitive drum 2030c.

Furthermore, the light beam from the cylindrical lens 2204d deflected at the polygon mirror 2104 is applied to the photosensitive drum 2030d through the scanning lens 2105d and the reflection mirror 2106d, and a beam spot is formed on the photosensitive drum 2030d.

The beam spots on the photosensitive drums are moved in the longitudinal direction of the photosensitive drums in association with the rotation of the polygon mirror 2104, and as a result, scanning lines are formed on the photosensitive drums. The moving direction of the beam spots at this time is "the main-scanning direction", and the rotation direction of the photosensitive drums is "the sub-scanning direction".

Optical systems disposed on the optical paths between the polygon mirror 2104 and the photosensitive drums are also referred to as scanning optical systems. In the embodiment, the scanning optical system of the K station is configured of the scanning lens 2105a and the reflection mirror 2106a.

Moreover, the scanning optical system of the C station is configured of the scanning lens 2105b, the dichroic mirror 2107, and the reflection mirror 2106b.

The scanning optical system of the M station is configured of the scanning lens 2105c and the reflection mirrors ($2106c_1$ and $2106c_2$).

Furthermore, the scanning optical system of the Y station is configured of the scanning lens 2105d and the reflection mirror 2106d.

In addition, the scanning optical system of the LC station is configured of the scanning lens 2105b, the dichroic mirror 2107, and the reflection mirror 2106e.

Since the rotation direction of the polygon mirror 2104 is the same for the photosensitive drums on the negative X side of the polygon mirror 2104 and the photosensitive drums on the positive X side of the polygon mirror 2104, the moving directions of the beam spots are reverse directions to each other, and latent images are formed in the Y-axis direction in such a way that the positions to start write on the photosensitive drums on one side are matched with the positions to end write on the photosensitive drums on the other side.

Now again referring to FIG. 2, a part of the light beam before starting write through the scanning lens 2105a of the K station is received at the leading end synchronization detection sensor 2111a through the synchronization lens 2110a.

Moreover, a part of the light beam before starting write through the scanning lens 2105d of the Y station is received at the leading end synchronization detection sensor 2111b through the synchronization lens 2110b.

Each one of the leading end synchronization detection sensors outputs signals corresponding to the received light quantities to the scanning control device 3022. It is noted that the output signals of the leading end synchronization detection sensors are also referred to as a "leading end synchronization signal".

Figure 3:
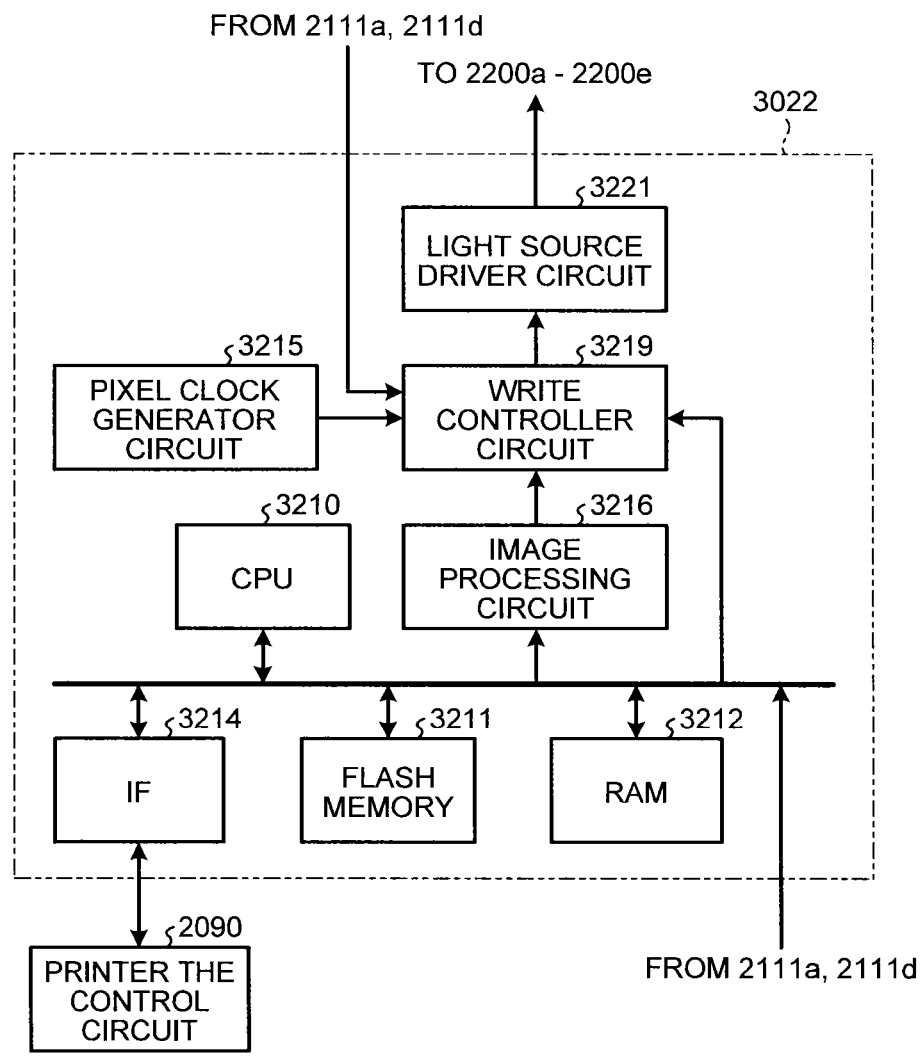
FIG. 3 is a block diagram for describing the configuration of a scanning control device.

The scanning control device 3022 includes a CPU 3210, a flash memory 3211, a RAM 3212, an IF (interface) 3214, a pixel clock generator circuit 3215, an image processing circuit 3216, a write controller circuit 3219, a light source driver circuit 3221, and so on, for example, as illustrated in FIG. 3. It is noted that arrows in FIG. 3 indicate the flows of representative signals and information, and do not indicate all the relationship between the connections of the blocks.

The pixel clock generator circuit 3215 generates a pixel clock signal. It is noted that the pixel clock signal can perform phase modulation at a resolution of a ⅛ clock.

The image processing circuit 3216 subjects image data in raster expansion for every color by the CPU 3210 to predetermined half tone processing or the like, and then generates dot data individually for the light-emitting elements of the light sources.

The write controller circuit 3219 determines the timing of starting write for every station based on the leading end synchronization signals. The write controller circuit 3219 then superimposes the dot data of the light-emitting elements on the pixel clock signal from the pixel clock generator circuit 3215 in synchronization with the timing of starting write, and generates modulated data independent for every light-emitting element. Moreover, the write controller circuit 3219 performs APC (Auto Power Control) at every predetermined timing.

The light source driver circuit 3221 outputs drive signals for the light-emitting elements to the light sources devices according to the items of modulated data from the write controller circuit 3219.

The IF (interface) 3214 is a communication interface that controls bi-directional communications with the printer controller 2090.

The flash memory 3211 stores various programs described in code decodable in the CPU 3210 and various items of data necessary to execute the programs.

The RAM 3212 is a working memory.

The CPU 3210 operates according to the programs stored in the flash memory 3211, and controls the overall optical scanning device 2010.

Here, as apparent from FIG. 4, the dichroic mirror 2107 is disposed in such a way that an angle of deviation 20b of the light beam seen from the negative Y-direction is an acute angle or a right angle, that is, an incident angle θb of the light beam to the dichroic mirror 2107 seen from the negative Y-direction is 0°<θb≤45°. It is noted that "an angle of deviation of a light beam" is an angle formed between the incident light beam to the dichroic mirror 2107 and the light beam reflected off the dichroic mirror 2107. The scanning lenses are omitted in FIG. 4 for convenience.

It is noted that the angle "θb" is also an angle formed between a normal to the incidence plane of the dichroic mirror 2107 and orthogonal projection to an assumed plane orthogonal to the main scanning corresponding direction (the Y-axis direction) of the incident path of the light beam to the incidence plane of the dichroic mirror 2107.

In this case, as described in detail below, leaking light beams are made less than in the case where an angle of deviation of a light beam on the dichroic mirror 2107 seen from the negative Y-direction is suppose to be an obtuse angle, that is, in the case of θb>45°, and the degradation of image quality can be suppressed.

It is noted that "the leaking light beam" means a light beam in the light beam for light cyan that reflects off the dichroic mirror 2107 and reaches the cyan photosensitive drum 2030b and a light beam in the light beam for cyan that passes through the dichroic mirror 2107 and reaches the light cyan photosensitive drum 2030e.

Figure 5A:
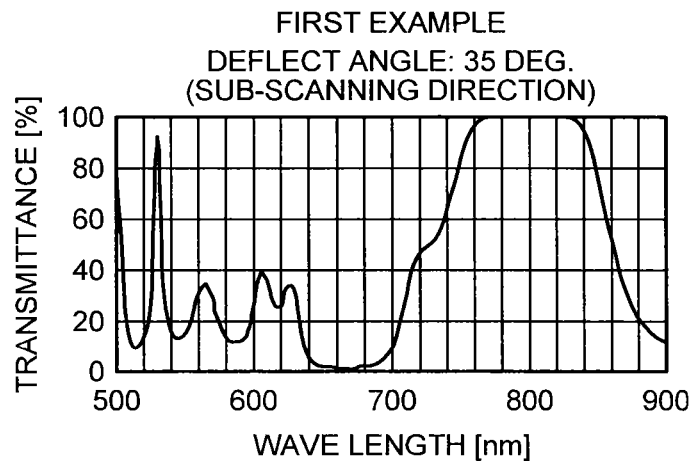
FIGS. 5A, 5B, and 5C are graphs of the relationship between the wave length of a light beam and the transmittance of a dichroic mirror to the light beam in a first example, a second example, and a first comparative example.
Figure 5B:
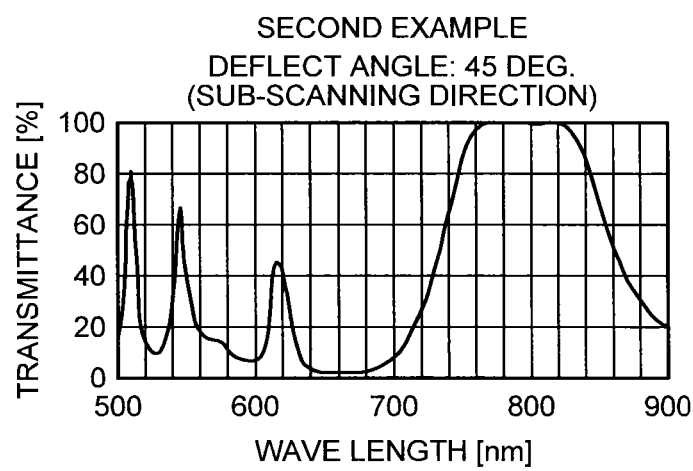
Figure 5C:
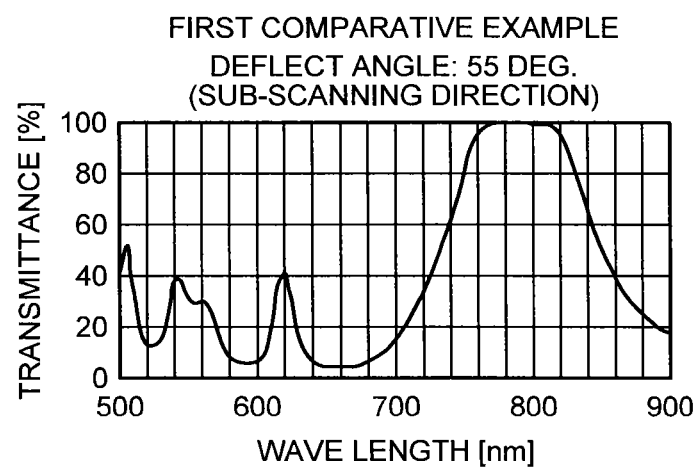

FIGS. 5A, 5B, and 5C are graphs of the relationship between the wave length of a light beam and the transmittance of the dichroic mirror to the light beam in a first example, a second example, and a first comparative example, respectively. In the first example, the second example, and the first comparative example, the incident angle of the light beam to the dichroic mirror seen from the negative Y-direction is set at angles of 35°, 45°, and 55°, respectively. It is noted that in FIGS. 5A, 5B, and 5C, the relationship between the wave length of a light beam and the transmittance of the dichroic mirror to the light beam is illustrated in the case where the light beam enters the dichroic mirror at a right angle seen from the positive Z-direction, that is, in the case where the incident angle of the light beam to the dichroic mirror seen from the positive Z-direction is at an angle of 0°.

Moreover, the number of layers of the multi-layer film of the dichroic mirror is 19 layers in FIGS. 5A to 5C. Table 1, Table 2, and Table 3 describe the conditions of the layer films in the first example, the second example, and the first comparative example, respectively.

TABLE 1

| Layer | Material | Refractive Index [λ = 655 nm] | Physical Thickness [nm] |
|---|---|---|---|
| Medium | Air | 1.00000 | |
| 1 | SiO$_2$ | 1.45640 | 230.86 |
| 2 | TiO$_2$ | 2.27259 | 68.34 |
| 3 | SiO$_2$ | 1.45640 | 122.90 |
| 4 | TiO$_2$ | 2.27259 | 41.78 |
| 5 | SiO$_2$ | 1.45640 | 133.27 |
| 6 | TiO$_2$ | 2.27259 | 53.00 |
| 7 | SiO$_2$ | 1.45640 | 176.66 |
| 8 | TiO$_2$ | 2.27259 | 82.05 |
| 9 | SiO$_2$ | 1.45640 | 610.58 |
| 10 | TiO$_2$ | 2.27259 | 90.13 |
| 11 | SiO$_2$ | 1.45640 | 175.71 |
| 12 | TiO$_2$ | 2.27259 | 32.51 |
| 13 | SiO$_2$ | 1.45640 | 637.95 |
| 14 | TiO$_2$ | 2.27259 | 71.23 |
| 15 | SiO$_2$ | 1.45640 | 902.70 |
| 16 | TiO$_2$ | 2.27259 | 52.70 |
| 17 | SiO$_2$ | 1.45640 | 678.83 |
| 18 | TiO$_2$ | 2.27259 | 19.46 |
| 19 | SiO$_2$ | 1.45640 | 165.51 |
| Substrate | Glass | 1.51438 | |

TABLE 2

| Layer | Material | Refractive Index [λ = 655 nm] | Physical Thickness [nm] |
|---|---|---|---|
| Medium | Air | 1.00000 | |
| 1 | TiO$_2$ | 2.27259 | 19.99 |
| 2 | SiO$_2$ | 1.45640 | 181.20 |
| 3 | TiO$_2$ | 2.27259 | 67.11 |
| 4 | SiO$_2$ | 1.45640 | 115.79 |
| 5 | TiO$_2$ | 2.27259 | 53.41 |
| 6 | SiO$_2$ | 1.45640 | 138.47 |
| 7 | TiO$_2$ | 2.27259 | 55.06 |
| 8 | SiO$_2$ | 1.45640 | 185.11 |
| 9 | TiO$_2$ | 2.27259 | 82.40 |
| 10 | SiO$_2$ | 1.45640 | 638.64 |
| 11 | TiO$_2$ | 2.27259 | 97.54 |
| 12 | SiO$_2$ | 1.45640 | 162.27 |
| 13 | TiO$_2$ | 2.27259 | 74.16 |
| 14 | SiO$_2$ | 1.45640 | 344.14 |
| 15 | TiO$_2$ | 2.27259 | 69.11 |
| 16 | SiO$_2$ | 1.45640 | 466.52 |
| 17 | TiO$_2$ | 2.27259 | 65.59 |
| 18 | SiO$_2$ | 1.45640 | 37.05 |
| 19 | TiO$_2$ | 2.27259 | 65.89 |
| Substrate | Glass | 1.51438 | |

TABLE 3

| Layer | Material | Refractive Index [λ = 655 nm] | Physical Thickness [nm] |
|---|---|---|---|
| Medium | Air | 1.00000 | |
| 1 | $TiO_2$ | 2.27259 | 26.36 |
| 2 | $SiO_2$ | 1.45640 | 173.36 |
| 3 | $TiO_2$ | 2.27259 | 68.90 |
| 4 | $SiO_2$ | 1.45640 | 118.45 |
| 5 | $TiO_2$ | 2.27259 | 57.78 |
| 6 | $SiO_2$ | 1.45640 | 130.40 |
| 7 | $TiO_2$ | 2.27259 | 75.08 |
| 8 | $SiO_2$ | 1.45640 | 157.72 |
| 9 | $TiO_2$ | 2.27259 | 98.76 |
| 10 | $SiO_2$ | 1.45640 | 648.10 |
| 11 | $TiO_2$ | 2.27259 | 109.91 |
| 12 | $SiO_2$ | 1.45640 | 169.20 |
| 13 | $TiO_2$ | 2.27259 | 79.63 |
| 14 | $SiO_2$ | 1.45640 | 357.48 |
| 15 | $TiO_2$ | 2.27259 | 60.04 |
| 16 | $SiO_2$ | 1.45640 | 494.35 |
| 17 | $TiO_2$ | 2.27259 | 54.82 |
| 18 | $SiO_2$ | 1.45640 | 48.46 |
| 19 | $TiO_2$ | 2.27259 | 63.88 |
| Substrate | Glass | 1.51438 | |

In the first and second examples, the waveband of the light beam for a specific color (light cyan) is the 780 nm waveband, and the wavebands of the light beams four basic colors are the 655 nm waveband. Therefore, it is shown that the characteristics of the dichroic mirror are preferable in which leaking light beams become less as the transmittance is larger (the reflectance is smaller) in the 780 nm waveband and the transmittance is smaller (the reflectance is larger) in the 655 nm waveband. When the dichroic mirror has the characteristics in a wider range of the wavebands, leaking light beams can be reliably made less even though the wave lengths of the light beams from the light sources fluctuate between lots, or because of temperature or the like.

With reference to FIGS. 5A to 5C, when the transmittance of the dichroic mirror to the light beam for cyan (the 655 nm waveband) is compared between the first example, the second example, and the first comparative example, it is shown that the transmittance is the lowest in the first example, whereas the transmittance is the highest in the first comparative example. Namely, it is shown that the leakage of the light beam for cyan is the lowest in the first example, whereas the leakage is the highest in the first comparative example.

Moreover, although it is difficult to make discrimination in FIGS. 5A to 5C, when the transmittance of the dichroic mirror to the light beam for light cyan (the 780 nm band) is compared between the first example, the second example, and the first comparative example, it is shown that the transmittance is the highest in the first example, whereas the transmittance is the lowest in the first comparative example. Namely, it is shown that the leakage of the light beam for light cyan is the lowest in the first example, whereas the leakage is the highest in the first comparative example.

As a result, it is shown that the leakage of the light beam for cyan and the leakage of the light beam for light cyan are smaller in the first and second examples than in the first comparative example. It is shown that leaking light beams can be made less as the incident angle of the light beam to the dichroic mirror seen from the negative Y-direction is smaller.

Furthermore, in the embodiment, the incident angle θb of the light beam to the dichroic mirror 2107 seen from the negative Y-direction is set smaller than the incident angles θa, θc, and θd of the light beams to the reflection mirrors 2106a, 2106$c_1$, and 2106d seen from the negative Y-direction (see FIG. 4). As a result, leaking light beams at the dichroic mirror 2107 can be made as less as possible, and the degradation of image quality can be suppressed. It is noted that the incident angles of the light beams to the reflection mirrors seen from the negative Y-direction are also an angle formed between the normal to the reflecting surfaces of the reflection mirrors and orthogonal projection to the assumed plane orthogonal to the main scanning corresponding direction (the Y-axis direction) of the incident paths of the light beams to the reflecting surfaces of the reflection mirrors. It is shown from FIG. 4 that the angle of deviation 20b of the light beam at the dichroic mirror 2107 is smaller than angles of deviation 20a, 20c, and 20d of the light beams at the reflection mirrors 2106a, 2106$c_1$, and 2106d.

Figure 6A:
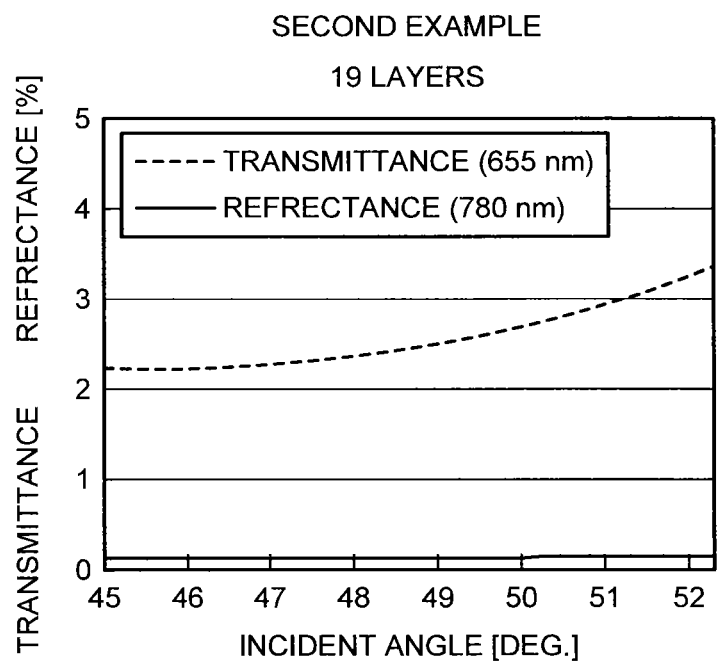
FIGS. 6A and 6B are graphs of the relationship between the incident angle of a light beam to a dichroic mirror and the transmittance of the dichroic mirror to a light beam in a 655 nm waveband and to a light beam in a 780 nm waveband in the second example and a second comparative example.

FIG. 6A is a graph (a solid line) of a change in the reflectance of the light beam for light cyan (the 780 nm band) and a graph (a broken line) of a change in the transmittance of the light beams for basic colors (the 655 nm waveband) to the incident angle of the light beam to the dichroic mirror having the film conditions in Table 2 (the second example). In this case, there is a larger number of leaking light beams as the values of the reflectance and the transmittance in FIG. 6A are larger.

Here, the incident angle plotted on the horizontal axis in FIG. 6A means the three-dimensional incident angle of a light beam to the incidence plane of the dichroic mirror. Here, the three-dimensional incident angle is at an angle of 45° when the light beam enters the incidence plane of the dichroic mirror at an angle of 45° seen from the negative Y-direction and at an angle of 0° seen from the positive Z-direction. From this state, the polygon mirror is rotated to increase the incident angle seen from the positive Z-direction from an angle of 45°. Although the incident angle seen from the positive Z-direction is an angle of about 30° in scanning the end part of the image region, the three-dimensional incident angle at this time is an angle of about 52°.

Figure 6B:
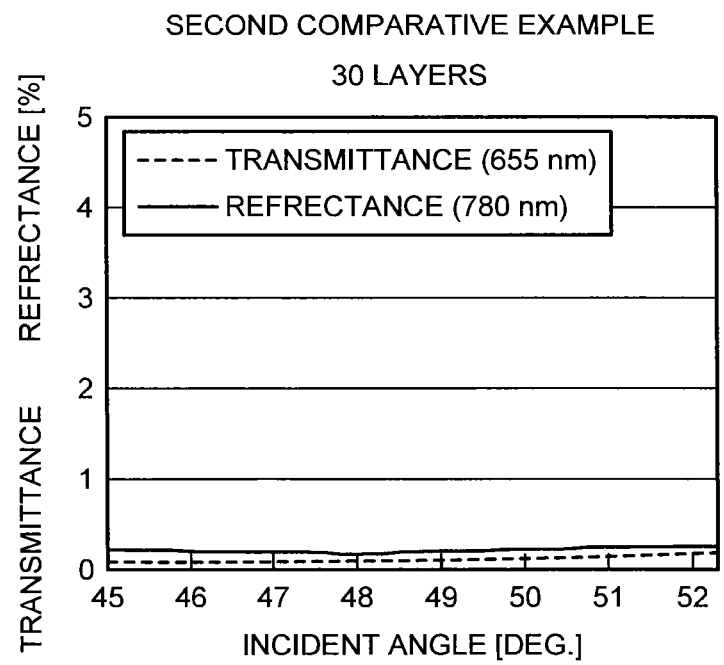

On the other hand, FIG. 6B is a graph (a solid line) of a change in the reflectance of the light beam for light cyan (the 780 nm band) and a graph (a broken line) of a change in the transmittance of the light beam for cyan (the 655 nm waveband) to the incident angle of the light beam to the dichroic mirror in the case where the number of layers of the multilayer film is 30 layers (a second comparative example). Table 4 is the conditions of the layer films at this time.

TABLE 4

| Layer | Material | Refractive Index [λ = 655 nm] | Physical Thickness [nm] |
|---|---|---|---|
| Medium | Air | 1.00000 | |
| 1 | $TiO_2$ | 2.27259 | 26.91 |
| 2 | $SiO_2$ | 1.45640 | 151.61 |
| 3 | $TiO_2$ | 2.27259 | 71.65 |
| 4 | $SiO_2$ | 1.45640 | 120.19 |
| 5 | $TiO_2$ | 2.27259 | 61.28 |
| 6 | $SiO_2$ | 1.45640 | 112.88 |
| 7 | $TiO_2$ | 2.27259 | 70.65 |
| 8 | $SiO_2$ | 1.45640 | 152.34 |
| 9 | $TiO_2$ | 2.27259 | 86.34 |
| 10 | $SiO_2$ | 1.45640 | 664.26 |
| 11 | $TiO_2$ | 2.27259 | 89.52 |
| 12 | $SiO_2$ | 1.45640 | 144.76 |
| 13 | $TiO_2$ | 2.27259 | 69.49 |
| 14 | $SiO_2$ | 1.45640 | 401.67 |
| 15 | $TiO_2$ | 2.27259 | 66.06 |
| 16 | $SiO_2$ | 1.45640 | 417.79 |
| 17 | $TiO_2$ | 2.27259 | 74.86 |
| 18 | $SiO_2$ | 1.45640 | 177.63 |
| 19 | $TiO_2$ | 2.27259 | 81.51 |

TABLE 4-continued

| Layer | Material | Refractive Index [λ = 655 nm] | Physical Thickness [nm] |
|---|---|---|---|
| 20 | SiO$_2$ | 1.45640 | 64.39 |
| 21 | TiO$_2$ | 2.27259 | 62.88 |
| 22 | SiO$_2$ | 1.45640 | 161.38 |
| 23 | TiO$_2$ | 2.27259 | 63.02 |
| 24 | SiO$_2$ | 1.45640 | 135.19 |
| 25 | TiO$_2$ | 2.27259 | 73.75 |
| 26 | SiO$_2$ | 1.45640 | 115.46 |
| 27 | TiO$_2$ | 2.27259 | 48.89 |
| 28 | SiO$_2$ | 1.45640 | 138.68 |
| 29 | TiO$_2$ | 2.27259 | 39.31 |
| 30 | SiO$_2$ | 1.45640 | 151.39 |
| Substrate | Glass | 1.51438 | |

It is shown that in the case where the number of layers of the multi-layer film is 30 layers, both of the reflectance of the light beam (the light beam for light cyan) in the 780 nm band and the transmittance of the light beam (the light beam for cyan) in the 655 nm waveband can be made close to 0% as compared with the case of 19 layers, and leaking light beams can be made as less as possible. However, when the number of layers is increased, cost is increased.

As illustrated in FIG. 6A, in the second example, the films of the dichroic mirror are designed in which the reflectance of the light beam in the 780 nm band is preferentially suppressed to nearly 0% with a fewer number of layers. Namely, the dichroic mirror 2107 is designed in such a way that the light quantity of the light beam reflected off the dichroic mirror 2107 in the light beam for light cyan is made smaller than the light quantity of the light beam transmitted through the dichroic mirror 2107 in the light beam for cyan.

Suppose that the dichroic mirror 2107 is designed in such a way that the reflectance of the light beam in the 780 nm band is made higher, the light quantity of the reflected light of the light beam for light cyan at the dichroic mirror 2107 is increased. In this case, a large quantity of unnecessary light beams of the light beam for light cyan reaches the cyan photosensitive drum 2030b, and the unnecessary light beams make an image visible, causing the degradation of image quality.

On the contrary, like the second example illustrated in FIG. 6A, in the case where the dichroic mirror 2107 is designed in such a way that the transmittance of the light beam in the 655 nm waveband is made higher, although the light beam for cyan reaches the light cyan photosensitive drum 2030e, a light color toner of low visibility is used for the light cyan toner, so that it is preferable because there is less influence on image quality even though the light beam for cyan makes an image on the photosensitive drum 2030e visible.

When a light beam is transmitted through the dichroic mirror tilted to the sub-scanning corresponding direction, scanning lines are tilted and curved on the scanned surface to cause the degradation of the image forming characteristics on the scanned surface, for example, which in turn further causes the degradation of image quality.

In this case, the tilt and curve of the scanning lines can be corrected by adjusting the attitude and deformation of the reflection mirror disposed in the subsequent stage of the dichroic mirror, and the image forming characteristics can be improved by additionally providing an image forming apparatus.

However, a correcting unit that corrects the tilt and curve of the scanning line and an image forming apparatus, for example, are additionally provided, and the components are likely to cause the degraded flexibility of the layout of the optical systems and an increase in cost. Moreover, even though the tilt and curve of the scanning line and the image forming characteristics are corrected, residual errors that are difficult to be corrected occur because of the fluctuation and changes over time of the components used for correction and the optical properties of the optical members configuring the optical systems, for example.

Therefore, in the embodiment, the light beam transmitted through the dichroic mirror 2107 is guided to the light cyan photosensitive drum 2030e of low visibility. As a result, the degradation of image quality can be suppressed as much as possible.

It is noted that more preferably, such a configuration may be possible in which the light beam for light cyan is combined with the light beam for yellow that is the lightest and of low visibility among four basic colors, and then the combined light beam is separated at the dichroic mirror. In this case, even though the leaking light beams of the light beam for light cyan reach the photosensitive drum 2030d of the Y station, image quality is not affected so much. The number of layers of the dichroic mirror 2107 may be reduced while suppressing the degradation of image quality.

The dichroic mirror 2107 necessitates to include a large number of stacked films is difficult to exert the performance of separating light beams when the size is increased, and the upsizing of the dichroic mirror 2107 directly leads to an increase in cost. Therefore, desirably, the dichroic mirror 2107 is downsized as small as possible.

In the embodiment, the surface area of the dichroic mirror 2107 is made smaller than the surface areas of the reflection mirror 2106a, the reflection mirror 2106$c_1$, and the reflection mirror 2106d, and the dichroic mirror 2107 is downsized smaller than the sizes of the reflection mirrors. As a result, cost is reduced.

Therefore, in order to cause the light beam deflected at the polygon mirror 2104 to enter the small dichroic mirror 2107, desirably, the light beam is caused to enter the dichroic mirror 2107 as quickly as possible.

As illustrated in FIG. 4, in the embodiment, an optical path length Lb of the light beam between the polygon mirror 2104 and the dichroic mirror 2107 is set shorter than optical path lengths La, Lc, and Ld of the light beams between the polygon mirror 2104 and the reflection mirror 2106a, the reflection mirror 2106$c_1$, and the reflection mirror 2106d.

As described above, the optical path of the light beam between the polygon mirror 2104 and the dichroic mirror 2107 is set shorter, so that the length of the dichroic mirror 2107 in the longitudinal direction (the main scanning corresponding direction) can be made shorter. Consequently, the dichroic mirror 2107 can be downsized, and cost can be reduced.

Since the refracting power of the light beam for light cyan whose wave length is a long wave length is smaller than the refracting power of the light beams for basic colors whose wave lengths are a short wave length, the light beam for light cyan enters a wider region of the photosensitive drum in transmitting the light beam for light cyan through substantially the same scanning lens. In this case, the light beam for light cyan can more easily scan the entire region necessary to scan, while improving the degree of freedom of design of the scanning optical systems. On the other hand, since the light beams for basic colors whose wave lengths are a short wave length can generate a beam spot in a smaller diameter, images in basic colors can be formed in higher definition.

Moreover, as the optical path length of the light beam between the polygon mirror and the photosensitive drum is longer, a wider region can be scanned on the photosensitive drum.

As apparent from FIG. 4, in the embodiment, the optical path length of the light beam for light cyan between the polygon mirror 2104 and the photosensitive drum 2030e is set longer than the optical path lengths of the light beams between the polygon mirror 2104 and the other photosensitive drums.

In this case, the light beam for light cyan can easily scan the entire region necessary to scan particularly. Furthermore, the light beam for light cyan of a small refracting power whose wave length is a long wave length can be imaged in a smaller diameter on the surface of the photosensitive drum.

In addition, in the embodiment, the sensitivity of the cyan photosensitive drum to the waveband of the light beam for light cyan (the 780 nm band) is set lower than the sensitivity to the waveband of the light beam for cyan (the 655 nm waveband). In this case, even though the light beam for light cyan is reflected at the dichroic mirror 2107, that is, there are leaking light beams reaching the cyan photosensitive drum 2030b, the sensitivity of the cyan photosensitive drum to the waveband of the leaking light beam is low, so that images can be prevented from being visible, which in turn can prevent the degradation of image quality.

The optical scanning device 2010 according to the embodiment described above includes the light source device 2100 including five light sources (2200a to 2200e) to emit five light beams corresponding to four basic colors and a single specific color, the polygon mirror 2104 that deflects the five light beams emitted from the light source device 2100, and five scanning optical systems that guide the five light beams deflected at the polygon mirror 2104 to the surfaces of the five corresponding photosensitive drums.

One light beam (the light beam for cyan) in a first waveband (the 655 nm waveband) among the light beams corresponding to four basic colors enters one scanning optical system (the scanning optical system of the C station or the scanning optical system of the LC station) of the five scanning optical systems.

Moreover, one scanning optical system includes the dichroic mirror 2107 that transmits a light beam in a second waveband (the 780 nm band) different from the first waveband, in which the angle θb formed between the normal to the incidence plane of the dichroic mirror 2107 and orthogonal projection to the assumed plane orthogonal to the main scanning corresponding direction of the incident path of the light beam to the incidence plane of the dichroic mirror 2107 is set to an angle of 0° or more and an angle of 45° or less.

Furthermore, a different light beam (the light beam for light cyan) in the second waveband is deflected at the polygon mirror 2104 in the state in which the light beam is combined with the light beam (the light beam for cyan) corresponding to one basic color among four basic colors, and enters the dichroic mirror 2107 through the scanning lens 2105b.

In this case, in the light beam for cyan and the light beam for light cyan (the combined light beam), the light beam for cyan is reflected off the dichroic mirror 2107, whereas the light beam for light cyan is transmitted through the dichroic mirror 2107.

As a result, according to the optical scanning device 2010, two light beams in different wavebands deflected at the polygon mirror 2104 (a combined light beam) can be separated from each other with a simple configuration while suppressing an increase in cost.

Moreover, the optical path of the light beam for cyan corresponding to one basic color and the optical path of the light beam for light cyan corresponding to a specific color are partially matched with each other, and the light beams are guided using common optical members (the aperture plate 2202b, the cylindrical lens 2204b, the polygon mirror 2104, the scanning lens 2105b, and the dichroic mirror 2107), so that the configuration can also be simplified, the cost of the configuration can also be reduced, and the device can also be downsized because of a reduction in the number of parts.

Furthermore, the light beam reflected off the dichroic mirror 2107 is guided to the cyan photosensitive drum 2030b, and the light beam transmitted through the dichroic mirror 2107 is guided to the light cyan photosensitive drum 2030e of lower visibility.

Since the condition θb≤45° is defined, leaking light beams at the dichroic mirror 2107 are reduced.

According to the color printer 2000, the color printer 2000 includes the optical scanning device 2010. As a result, multicolor images of high quality can be formed while simplifying the configuration, decreasing the cost of the configuration, and downsizing the configuration.

Moreover, the color printer 2000 is connected to an electronic arithmetic and logic device (such as a computer), an image information communication system (such as a facsimile), and the like through the network, so that it is possible to form an information processing system that can process outputs from a plurality of devices on a single image forming apparatus. Furthermore, when a plurality of image forming apparatuses is connected to the network, the states of the image forming apparatuses can be known from output requests (how busy jobs are, the power supply is turned on or off, the image forming apparatuses are troubled or not, and so on), and an image forming apparatus in the best state (which is suited for a desire of a user) can be selected for forming images.

It is noted that the present invention is not limited to the aforementioned embodiment, and the present invention can be modified variously.

Such a color printer 3000 may be adopted as a base apparatus having a configuration in which components for the specific color (light cyan) are removed from the color printer 2000, instead of the color printer 2000 according to the aforementioned embodiment. In this case, images with four basic colors and images with four basic colors and a single specific color are selectively formed by attaching and detaching components for the specific color to and from the color printer 3000.

Figure 9:
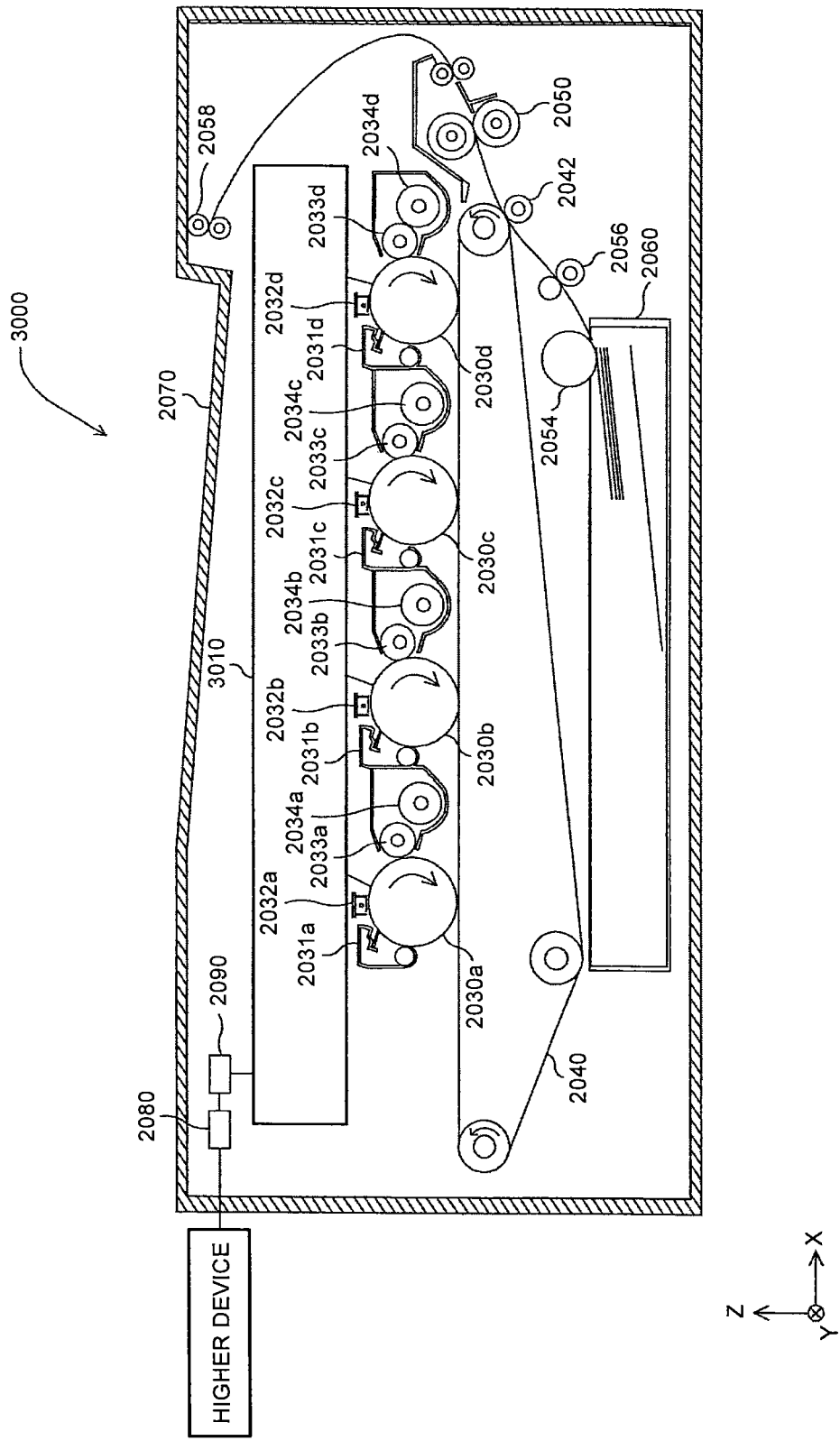
FIG. 9 is a diagram of the schematic configuration of a color printer according to a third exemplary modification.

More specifically, as illustrated in FIG. 9, different from the color printer 2000, the color printer 3000 does not include the light cyan photosensitive drum 2030e, the cleaning unit 2031e, the charging device 2032e, the developing roller 2033e, and the toner cartridge 2034e, and these components are detachably configured as necessary. Namely, the color printer 3000 functions as the color printer 2000 by attaching the components for light cyan. On the contrary, the color printer 2000 functions as the color printer 3000 by detaching the components for light cyan.

Figure 10:
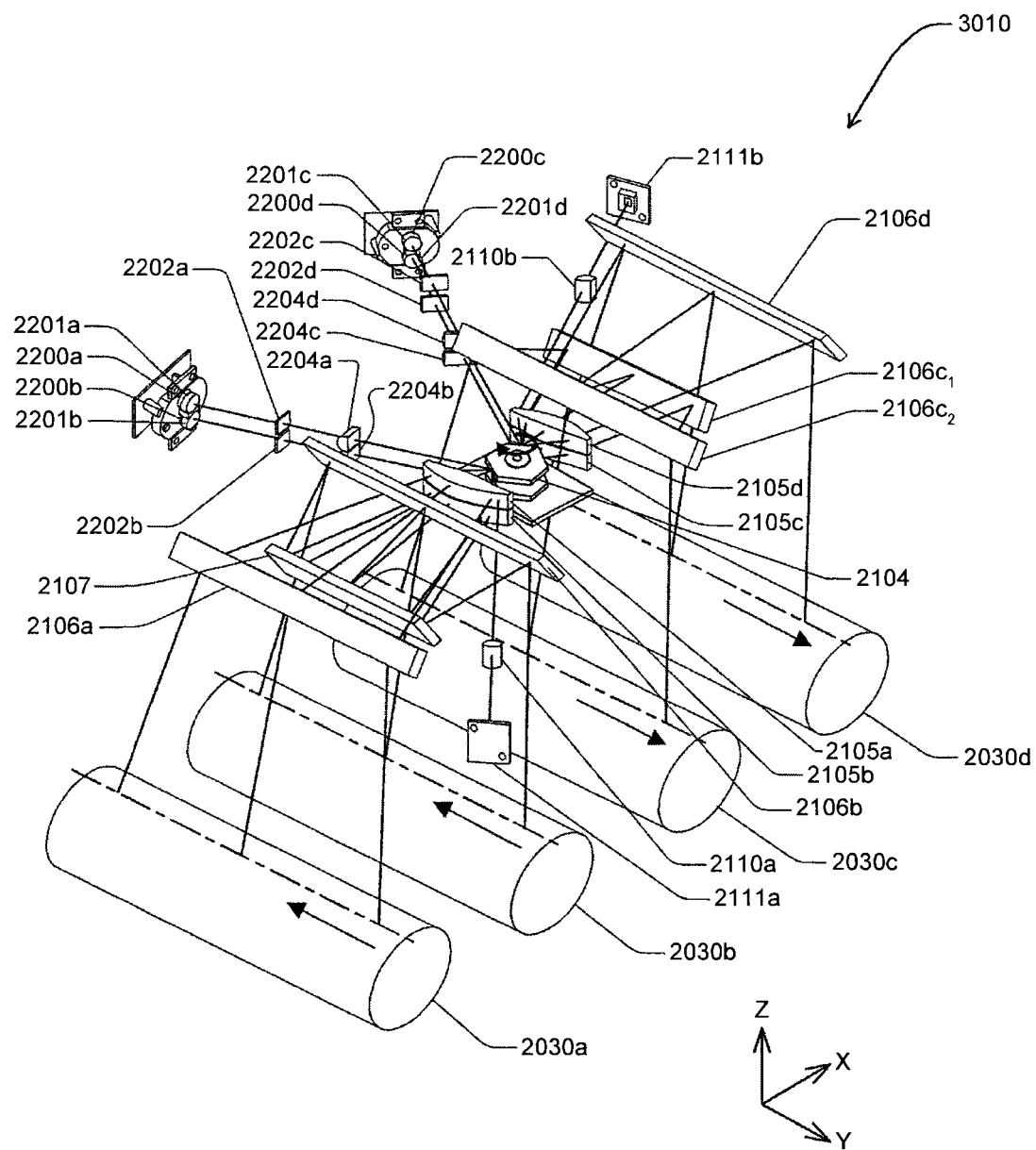
FIG. 10 is a diagram for describing an optical scanning device according to the third exemplary modification.

Moreover, as illustrated in FIG. 10, different from the optical scanning device 2010, an optical scanning device 3010 included in the color printer 3000 does not include the light cyan light source 2200e, the coupling lens 2201e, the polarization beam splitter 2203, and the reflection mirror 2106e, and these components are detachable as necessary.

It is noted that in the case where the color printer 3000 is used only as a base apparatus, a reflection mirror, which is a simple reflecting mirror, may be adopted, instead of the dichroic mirror 2107. As a result, cost can be decreased.

Furthermore, the configuration of the light source device 2100 according to the aforementioned embodiment can be changed appropriately.

In the aforementioned embodiment, the dichroic mirror 2107 is adopted as an optical member to separate the light beam for cyan from the light beam for light cyan. However, the member is not limited to the dichroic mirror 2107. In short, the member may be a prism, for example, as long as the member can separate light beams in different wavebands from each other.

Figure 7:
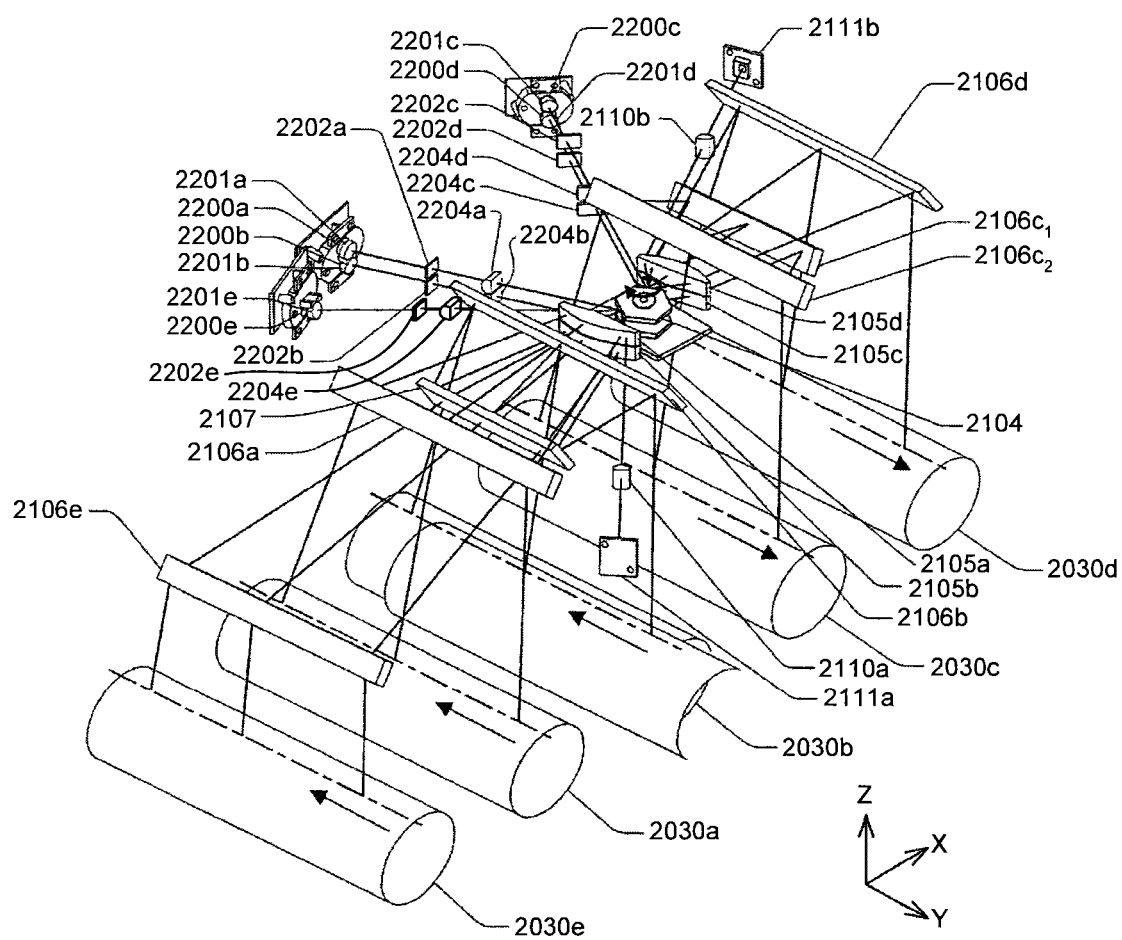
FIG. 7 is a diagram for describing an optical scanning device according to a first exemplary modification.

In the aforementioned embodiment, two light beams from the two light sources (2200*b* and 2200*e*) are combined using the polarization beam splitter 2203. However, as illustrated in FIG. 7, the two light sources (2200*b* and 2200*e*) may be disposed in such a way that the light beam for light cyan intersects with the light beam for cyan on the deflection reflecting surface of the polygon mirror 2104.

In this case, the rotation angle (the rotational position) of the polygon mirror 2104 is different between the light beam for light cyan and the light beam for cyan when the light beam for light cyan and the light beam for cyan reach the same image regions on the corresponding photosensitive drums. The incident point (the reflecting point) on the polygon mirror 2104 is different between the two light beams when the two light beams reach the same image regions, and the incident position to the scanning lens 2105*b* is in turn different between the two light beams. In addition, an aperture plate 2202*e* and a cylindrical lens 2204*e* are provided on the optical path between the light source 2200*e* and the polygon mirror 2104.

As a result, it is difficult to excellently maintain the image forming characteristics of the two light beams. Therefore, preferably, the scanning lens 2105*b* is optimized for the optical properties of the light beam for cyan. As a result, the degradation of image quality can be suppressed.

Figure 8:
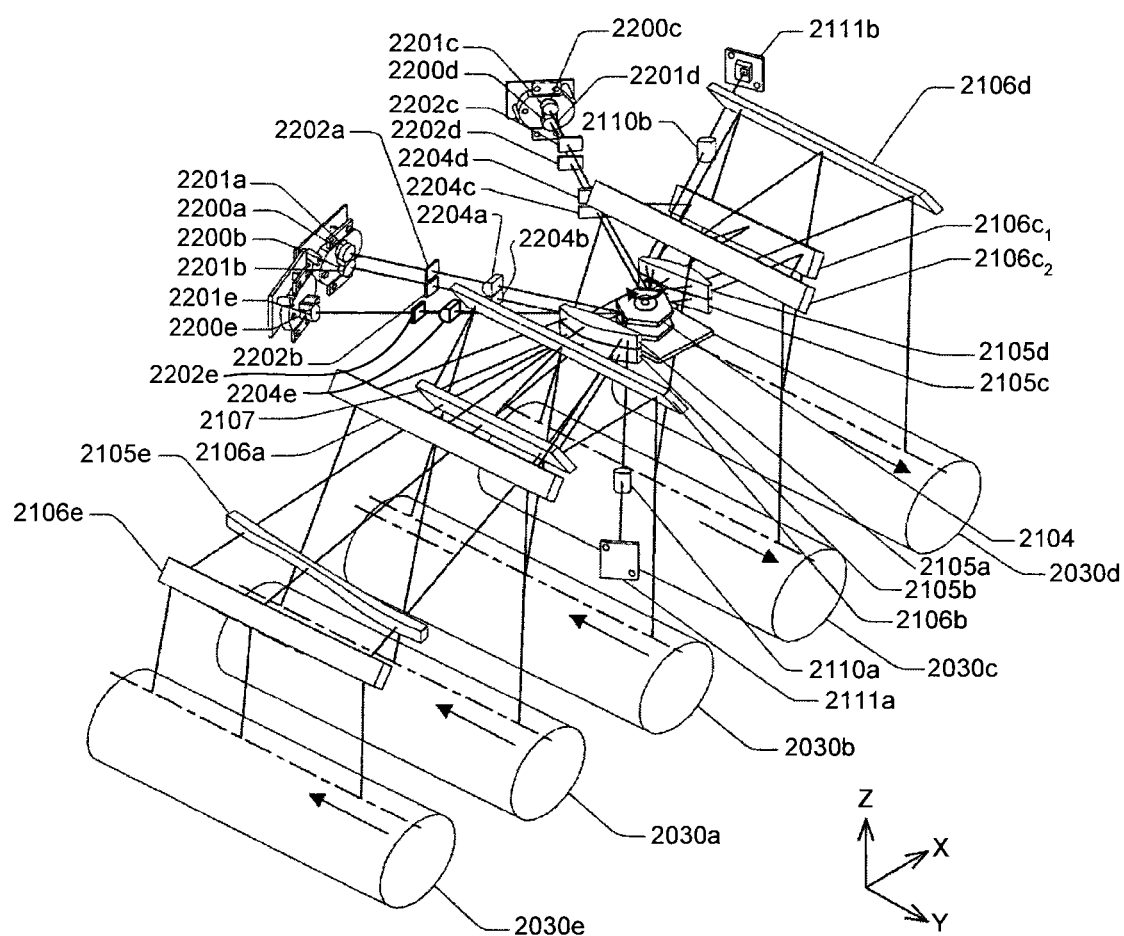
FIG. 8 is a diagram for describing an optical scanning device according to a second exemplary modification.

In addition, as illustrated in FIG. 8, such a configuration may be possible in which a scanning lens 2105*e* that transmits only the light beam for light cyan is additionally provided for improving the optical properties of the light beam for light cyan.

Moreover, the light beam for light cyan may be caused to enter the polygon mirror 2104 in such a way that the light beam for light cyan is tilted or shifted to the sub-scanning corresponding direction.

In the aforementioned embodiment, the optical scanning device 2010 guides the light beams for four basic colors and the light beam for a single specific color to the corresponding photosensitive drums. However, the configuration is not limited thereto. In short, a plurality of light beams for basic colors and at least one light beam for a single specific color may be guided to the corresponding photosensitive drums. However, in this case, the color printer is necessary to include photosensitive drums in the same number as the total number of the number of the light beams for basic colors and the number of the light beam for a specific color. In this case, light sources in the same number as the number of the photosensitive drums may be provided. Alternatively, such a configuration may be possible in which at least one light source, which the number of the light source is smaller than the number of photosensitive drums, and a light beam from at least one light source is separated into a plurality of light beams for obtaining light beams in the same number as the number of the photosensitive drums.

For a specific example, such a configuration may be possible in which a plurality of light beams for a specific color is combined with light beams for different basic colors, the combined light beams are deflected at the polygon mirror, and then the combined light beams are separated at the dichroic mirror. Namely, such a configuration may be possible in which a dichroic mirror is provided on a plurality of scanning optical systems that guide the light beams for basic colors to be combined with the light beams for a specific color to the corresponding scanned surfaces.

In the aforementioned embodiment, four basic colors (black, cyan, magenta, and yellow) are process colors. However, process colors are not limited to these colors. For example, N+1 colors may be process colors in which one corporate color (a company's symbol color) is added to N (N≥1) basic colors.

In the aforementioned embodiment, light cyan, which is a light color, is adopted as a specific color. However, the specific color is not limited to light cyan. In short, the specific color may be a color of low visibility. At least one color may be adopted as a specific color among light colors and transparent colors such as light magenta, light gray, and beige, for example, other than light cyan.

In the aforementioned embodiment, the light sources include a single light-emitting element (a semiconductor laser). The light sources may include a plurality of light-emitting elements, instead of a single light-emitting element. More specifically, the light sources may include a laser array such as a semiconductor laser array and a surface emitting laser array, for example. In this case, the photosensitive drum can be scanned along a plurality of scanning lines simultaneously. As a result, the pixel density of a latent image can be increased, or the velocity of forming a latent image can be increased.

However, in this case, it is necessary to make a space between the light beams (a sub scanning beam pitch) on the photosensitive drum in the sub-scanning direction equal among the photosensitive drums. To this end, it is necessary to make the rotation angle (the rotational position) about the emitting direction equal between the basic color light sources and the specific color light source; light beams emitted from the light sources are combined with each other. Therefore, in the case where the light source includes a plurality of light-emitting elements, such a configuration may be possible in which a half-wave plate is disposed on the optical path of one of the light beam for a specific color and the light beams for basic colors, the polarization direction of the light beam is rotated at an angle of 90°, and then the light beams for basic colors are combined with the light beam for a specific color. It is noted that with the other configurations, the polarization states of the basic color light sources may be different from the polarization state of the specific color light source; light beams emitted from the light sources are combined with each other.

Moreover, in the embodiment, the polarization beam splitter 2203 is used for a combining unit that combines the light beams for basic colors with the light beam for a specific color. However, the combining unit is not limited to the polarization beam splitter 2203. More specifically, a dichroic mirror may be used, for example. In this case, one of the light beam for a specific color and the light beams for basic colors in different wavebands is transmitted through the dichroic mirror, and the other is reflected off the dichroic mirror in one of the transmitting directions, so that the two light beams can be combined with each other. In this case, the light beams for basic colors and the light beam for a specific color can be combined with each other regardless of the polarization directions. Namely, it is unnecessary to vary the polarization directions between the basic color light sources and the specific color light source, as compared with the case of using the polarization beam splitter 2203. Therefore, in the case where the light source includes a plurality of light-emitting elements, the rotation angle about the emitting direction can be made equal between the basic color light sources and the specific color light source, and it is unnecessary to provide an optical member such as the above-described half-wave plate.

It is noted that in the case where the light beams for basic colors are combined with the light beam for a specific color in different wavebands using the dichroic mirror, the following is preferable, in which the light beams for basic colors are reflected, whereas the light beam for a specific color is transmitted, that is, the light beam transmitted through the dichroic mirror is guided to the specific color photosensitive drum of low visibility. As a result, the degradation of image quality can be suppressed as much as possible.

In the aforementioned embodiment, the scanning optical systems include a single scanning lens, one or two reflection mirrors, and a dichroic mirror (which is included only in the scanning optical system of the LC station). However, the configuration is not limited thereto, and the configuration can be changed appropriately. For example, such a configuration may be possible in which at least one reflection mirror is additionally provided in at least one of the subsequent stages of the four reflection mirrors 2106a, 2106b, 2106$c_2$, and 2106d.

In the aforementioned embodiment, the incident angle θb of the light beam to the dichroic mirror 2107 seen from the negative Y-direction is set in 0°<θb≤45°. However, the incident angle θb may be set in 45°<θb<90°.

In the aforementioned embodiment, the incident angle θb of the light beam that enters the dichroic mirror 2107 seen from the negative Y-direction is set smaller than three incident angles θa, θc, and θd of the light beams that enter the reflection mirrors 2106a, 2106$c_1$, and 2106d seen from the negative Y-direction. However, the setting may not be provided in this manner.

In the aforementioned embodiment, the dichroic mirror 2107 has the characteristic in which the power of the light beam reflected off the dichroic mirror 2107 in the light beam for light cyan is smaller than the power of the light beam transmitted through the dichroic mirror 2107 in the light beam for cyan. However, the dichroic mirror 2107 may have the opposite characteristic.

In the aforementioned embodiment, the dichroic mirror 2107 is set in such a way that the dimension in the main scanning corresponding direction is made shorter than the dimensions of the reflection mirrors 2106a, 2106$c_1$, and 2106d. However, the dichroic mirror 2107 may not be set in this manner.

In the aforementioned embodiment, the optical path length of the light beam between the dichroic mirror 2107 and the polygon mirror 2104 is set shorter than the optical path lengths of the light beams between the three reflection mirrors 2106a, 2106$c_1$, and 2106d and the polygon mirror 2104. However, the optical path length may not be set in this manner.

In the aforementioned embodiment, the waveband of the light beam for light cyan is on the long wave length side of the wavebands of the light beams four basic colors. However, the waveband of the light beam for light cyan may be on the short wave length side.

In the aforementioned embodiment, the wavebands of the light beams for four basic colors are the same waveband (the 655 nm band). However, the wavebands may be different wavebands. However, it is necessary to vary the waveband of the light beam for light cyan from the waveband of the light beam for cyan.

In the aforementioned embodiment, the optical path length of the light beam between the light cyan photosensitive drum and the polygon mirror 2104 is set longer than the optical path lengths of the light beams between the four basic color photosensitive drums and the polygon mirror 2104. However, the configuration is not limited thereto.

In the aforementioned embodiment, the sensitivity of the cyan photosensitive drum to the waveband of the light beam for light cyan is lower than the sensitivity to the wavebands of the light beams four basic colors. In short, the sensitivity may be lower than the sensitivity to at least the waveband of the light beam for cyan.

Moreover, for example, such a configuration may be possible in which the operating unit of the color printer can switch print modes between a general mode in which only four basic colors are used and a high image quality mode in which four basic colors and a single specific color are used. In this case, the light cyan light source 2200e is driven only in the case where the high image quality mode is selected.

In the aforementioned embodiment, a semiconductor laser is used for the light-emitting elements. However, other lasers may be used.

In the aforementioned embodiment, the four photosensitive drums are arranged in order of the light cyan, black, cyan, magenta, and yellow photosensitive drums from the negative X side to the positive X side. However, the order of arrangement can be changed appropriately.

Furthermore, in the aforementioned embodiment, a synchronization mirror and a trailing end synchronization detection sensor may be further provided to receive a part of the light beams transmitted through the scanning optical systems of the stations after writing data.

In this case, the CPU 3210 can determine, for every station, time required for scanning a gap between the leading end synchronization detection sensor and the trailing end synchronization detection sensor by the light beam from the output signal of the leading end synchronization detection sensor and the output signal of the trailing end synchronization detection sensor, and the CPU 3210 can again set the reference frequency of the pixel clock signal in such a way that pulses in the preset number fall in the time. Thus, it is possible to stably hold the overall width scaling factors of images on the transfer belt recorded at the stations.

In addition, in the aforementioned embodiment, the description is made in the case where the toner image is transferred on the recording sheet from the photosensitive drum through the transfer belt. However, the configuration is not limited thereto. The toner image may be directly transferred to the recording sheet.

Moreover, in the aforementioned embodiment, the case of the color printer 2000 is described as an image forming apparatus. However, the image forming apparatus is not limited to the color printer 2000. The image forming apparatus may be an optical plotter or a digital reproducing apparatus, for example.

Furthermore, the image forming apparatus may be an image forming apparatus using a silver halide film for an image carrier. In this case, a latent image is formed on a silver halide film, and this latent image can be made visible by the process equivalent to the development process in the general silver halide photography process. The image can be transferred to a photographic printing paper sheet that is a transfer object by the process equivalent to the printing process in the general silver halide photography process. This image forming apparatus can be implemented as an optical platemaking apparatus or an optical drawing apparatus that draws CT scan images, for example.

In addition, the image forming apparatus may be an image forming apparatus using a developing medium (a positive photographic printing paper sheet) that develops colors as an image carrier with thermal energy of beam spots. In this case, a visible image can be directly formed on an image carrier by optical scanning.

According to the present invention, it is possible to separate a plurality of light beams (combined light beams) deflected at a deflector in different wavebands with a simple configuration while suppressing an increase in cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a plurality of scanned surfaces in a main-scanning direction with a plurality of light beams, the optical scanning device comprising:
    a light source device including at least one light source and configured to emit a plurality of light beams including a plurality of light beams corresponding to at least process colors;
    a deflector configured to deflect the plurality of light beams emitted from the light source device; and
    a plurality of scanning optical systems configured to guide the plurality of light beams deflected at the deflector to the plurality of corresponding scanned surfaces,
    wherein:
    one light beam in a first waveband of the plurality of light beams corresponding to the process colors enters one scanning optical system of the plurality of scanning optical systems,
    the one scanning optical system includes an optical member configured to reflect the one light beam and transmit a light beam in a second waveband different from the first waveband,
    an angle formed between a normal to an incidence plane of the optical member and orthogonal projection to an assumed plane orthogonal to a direction corresponding to the main-scanning direction of an incident path of the light beam to the incidence plane of the optical member is an angle of 0° or more and an angle of 45° or less,
    the scanning optical systems of the plurality of scanning optical systems except the one scanning optical system include a reflecting mirror to reflect the corresponding light beam, and
    the angle is smaller than an angle formed between a normal to a reflecting surface of the reflecting mirror and orthogonal projection to an assumed plane of an incident path of the corresponding light beam to the reflecting surface of the reflecting mirror.

2. The optical scanning device according to claim 1, wherein a dimension of the optical member in a direction corresponding to the main-scanning direction is shorter than a dimension of the reflecting mirror in the direction corresponding to the main-scanning direction.

3. The optical scanning device according to claim 1, wherein an optical path length of the one light beam between the deflector and the optical member is shorter than an optical path length of the corresponding light beam between the deflector and the reflecting mirror.

4. The optical scanning device according to claim 1, wherein the light beam corresponding to a lightest color in the process colors enters the one scanning optical system.

5. The optical scanning device according to claim 1, wherein the second waveband is on a long wave length side of the first waveband.

6. The optical scanning device according to claim 1, wherein
    the plurality of light beams includes a different light beam in the second waveband in addition to the plurality of light beams corresponding to the process color,
    the different light beam enters the one scanning optical system together with the one light beam, and
    an optical path length of the different light beam between the deflector and the scanned surface corresponding to the different light beam is longer than optical path lengths of the plurality of light beams corresponding to the process colors between the deflector and the scanned surfaces corresponding to the plurality of light beams corresponding to the process colors.

7. The optical scanning device according to claim 1, wherein
    the light beam in the first waveband passes through a cylindrical lens provided between the deflector and a light source emitting the light beam in the first waveband, and
    the light beam in the second waveband passes through the cylindrical lens.

8. The optical scanning device according to claim 1, wherein
    an angle formed between orthogonal projection of an incident light beam in the first waveband to a plane perpendicular to the deflector and orthogonal projection of an incident light beam in the second waveband to the deflector is an angle of 0° or more.

9. The optical scanning device according to claim 1, wherein the light beam in the second waveband corresponds to a transparent color.

10. The optical scanning device according to claim 1, wherein the light beam in the second waveband corresponds to a light color.

11. An image forming apparatus comprising:
    a plurality of image carriers including a plurality of image carriers corresponding to at least process colors; and
    an optical scanning device that scans a plurality of image carriers in a main-scanning direction with a plurality of light beams,
    wherein:
    the optical scanning device comprises;
    a light source device including at least one light source and configured to emit a plurality of light beams including a plurality of light beams corresponding to at least process colors,
    a deflector configured to deflect the plurality of light beams emitted from the light source device, and
    a plurality of scanning optical systems configured to guide the plurality of light beams deflected at the deflector to the plurality of corresponding image carriers,
    one light beam in a first waveband of the plurality of light beams corresponding to the process colors enters one scanning optical system of the plurality of scanning optical systems,
    the one scanning optical system includes an optical member configured to reflect the one light beam and transmit a light beam in a second waveband different from the first waveband, an angle formed between a normal to an incidence plane of the optical member and orthogonal projection to an assumed plane orthogonal to a direction corresponding to the main-scanning direction of an incident path of the light beam to the incidence plane of the optical member is an angle of 0° or more and an angle of 45° or less, the optical scanning device scans one image carrier of the plurality of image carriers corresponding to the process colors with the one light beam, the scanning optical systems of the plurality of scanning optical systems except the one scanning optical system include a reflecting mirror to reflect the corresponding light beam, and the angle is smaller than an angle formed between a normal to a reflecting surface of the reflecting mirror and orthogonal projection to an assumed plane of an incident path of the corresponding light beam to the reflecting surface of the reflecting mirror.

12. The image forming apparatus accruing to claim 11, wherein a sensitivity of the one image carrier to the light beam in the second waveband is lower than a sensitivity to the light beam in the first waveband.

13. An optical scanning device that scans a plurality of scanned surfaces in a main-scanning direction with a plurality of light beams, the optical scanning device comprising:

a light source device including at least one light source and configured to emit a plurality of light beams including a plurality of light beams corresponding to at least process colors;

a deflector configured to deflect the plurality of light beams emitted from the light source device; and a plurality of scanning optical systems configured to guide the plurality of light beams deflected at the deflector to the plurality of corresponding scanned surfaces, wherein:

one light beam in a first waveband of the plurality of light beams corresponding to the process colors enters one scanning optical system of the plurality of scanning optical systems, the one scanning optical system includes an optical member configured to reflect a large quantity of the light beam in the first waveband in concurrence with transmitting a small quantity of the light beam in the first waveband, and transmit a large quantity of light beam in a second waveband different from the first waveband in concurrence with reflecting a small quantity of the light beam in the second waveband, an angle formed between a normal to an incidence plane of the optical member and orthogonal projection to an assumed plane orthogonal to a direction corresponding to the main-scanning direction of an incident path of the light beam to the incidence plane of the optical member is an angle of 0° or more and an angle of 45° or less, and a light quantity of the light beam reflected at the optical member in the light beam in the second waveband is smaller than a light quantity of the light beam transmitted through the optical member in the light beam in the first waveband, the scanning optical systems of the plurality of scanning optical systems except the one scanning optical system include a reflecting mirror to reflect the corresponding light beam, and the angle is smaller than an angle formed between a normal to a reflecting surface of the reflecting mirror and orthogonal projection to an assumed plane of an incident path of the corresponding light beam to the reflecting surface of the reflecting mirror.

* * * * *